United States Patent
Seo et al.

(10) Patent No.: US 9,497,752 B2
(45) Date of Patent: Nov. 15, 2016

(54) METHOD FOR FORMING RESOURCE BLOCK FOR SEARCH REGION IN DISTRIBUTION-TYPE DOWNLINK CONTROL CHANNEL IN WIRELESS COMMUNICATION SYSTEM, AND APPARATUS THEREFOR

(71) Applicant: LG ELECTRONICS INC., Seoul (KR)

(72) Inventors: Hanbyul Seo, Anyang-si (KR); Myungseop Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 14/387,314

(22) PCT Filed: Apr. 2, 2013

(86) PCT No.: PCT/KR2013/002717
§ 371 (c)(1),
(2) Date: Sep. 23, 2014

(87) PCT Pub. No.: WO2013/151300
PCT Pub. Date: Oct. 10, 2013

(65) Prior Publication Data
US 2015/0085772 A1    Mar. 26, 2015

Related U.S. Application Data

(60) Provisional application No. 61/619,396, filed on Apr. 2, 2012, provisional application No. 61/623,583, filed on Apr. 13, 2012, provisional application No. 61/648,040, filed on May 16, 2012, provisional (Continued)

(30) Foreign Application Priority Data

Apr. 1, 2013    (KR) .................. 10-2013-0035132

(51) Int. Cl.
*H04W 4/00*    (2009.01)
*H04W 72/04*    (2009.01)
(Continued)

(52) U.S. Cl.
CPC .......... *H04W 72/042* (2013.01); *H04L 5/0053* (2013.01); *H04L 5/0094* (2013.01); *H04W 24/00* (2013.01); *H04W 72/00* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 2011/0310817 A1* | 12/2011 | Okubo | H04L 5/0003 370/329 |
| 2013/0039284 A1* | 2/2013 | Marinier | H04L 5/001 370/329 |
| 2013/0230015 A1* | 9/2013 | Hoymann | H04L 5/0053 370/329 |

OTHER PUBLICATIONS

NTT DOCOMO, "Mapping Design for E-PDCCH in Rel-11," 3GPP TSG RAN WG1 Meeting #67, R1-114081, San Francisco, USA, Nov. 14-18, 2011, pp. 1-5.

(Continued)

*Primary Examiner* — Chi H Pham
*Assistant Examiner* — Fahmida Chowdhury
(74) *Attorney, Agent, or Firm* — Birch, Stewart, Kolasch & Birch, LLP

(57) ABSTRACT

The present invention relates to a method for a terminal to receive an enhanced physical downlink control channel (EPDCCH) from a based station in a wireless communication system. More particularly, the method includes the steps of: defining a first number of enhanced resource element groups (EREGs) for each resource block for the EPDCCH; monitoring EPDCCH candidates consisting of one or more enhanced control channel elements (ECCEs) in resource blocks so as to receive the EPDCCH, wherein each of the one or more ECCEs consists of a second number of EREGs included in different resource blocks, and the indexes of the resource blocks including the second number of EREGs are determined on the basis of a specific value obtained by dividing the number of resource blocks by the second number.

16 Claims, 33 Drawing Sheets

Related U.S. Application Data application No. 61/650,418, filed on May 22, 2012, provisional application No. 61/679,060, filed on Aug. 2, 2012, provisional application No. 61/706,796, filed on Sep. 28, 2012, provisional application No. 61/709,977, filed on Oct. 4, 2012, provisional application No. 61/673,737, filed on Jul. 20, 2012.

(51) Int. Cl.
*H04L 5/00* (2006.01)
*H04W 24/00* (2009.01)
*H04W 72/00* (2009.01)

(56) References Cited

OTHER PUBLICATIONS

Samsung, "Search Space Design for DL Enhanced Control Channels," 3GPP TSG RAN WG1 #67, R1-114242, San Francisco, USA, Nov. 14-18, 2011, pp. 1-3.

Ericsson et al., "Search spaces for ePDCCH," 3GPP TSG-RAN WG1 #68bis, R1-121022, Jeju, Republic of Korea, Mar. 26-30, 2012, 4 pages.

KDDI Corporation, "Consideration on RE mapping for distributed ePDCCH transmission with transmission diversity," 3GPP TSG RAN WG1 Meeting #68 bis, R1-121600, Jeju Island, Korea, Mar. 26-30, 2012, 5 pages.

Samsung, "Discussion on ePDCCH Design Issues," 3GPP TSG-RAN1#66 meeting, R1-112517, Athens, Greece, Aug. 22-26, 2011, 5 pages (pp. 1-4 and 1-1).

Zte et al., "Way Forward on resource mapping for ePDCCH," TSG RAN WG1 #68bis, R1-121874, Jeju, Korea, Mar. 26-30, 2012, 4 pages.

Ericsson et al., "On multiplexing of DCI messages," 3GPP TSG-RAN WG1 #68, Feb. 6-10, 2012, 5 pages, R1-120078, XP50562658.

NTT DOCOMO, "Resource Mapping Scheme for E-PDCCH," 3GPP TSG RAN WG1 Meeting #68bis, Mar. 26-30, 2012, pp. 1-6, R1-121477, XP50599758.

* cited by examiner

FIG. 2
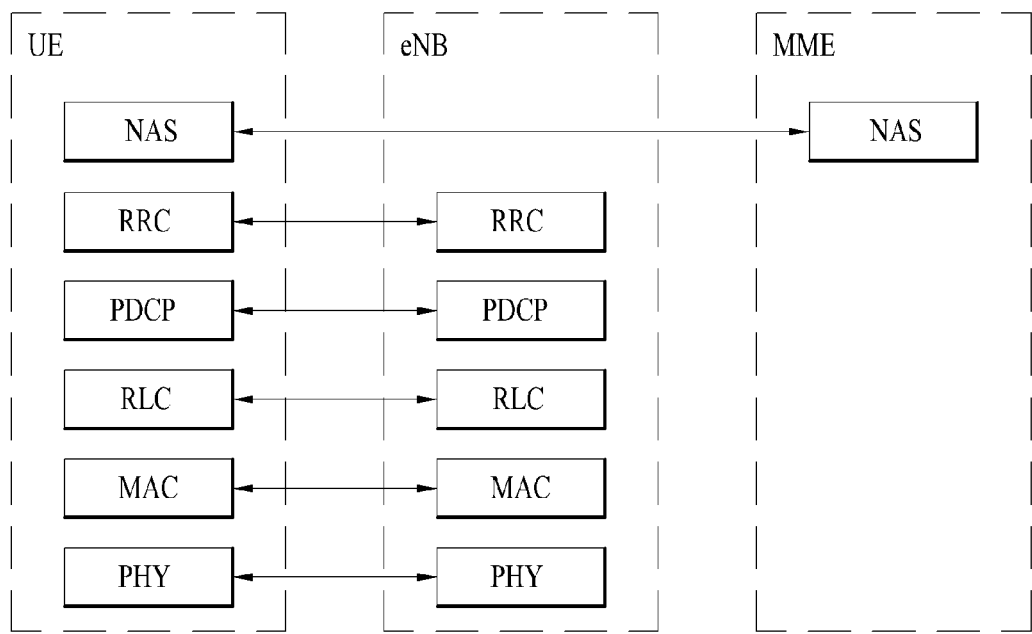
(a) Control-plane protocol stack
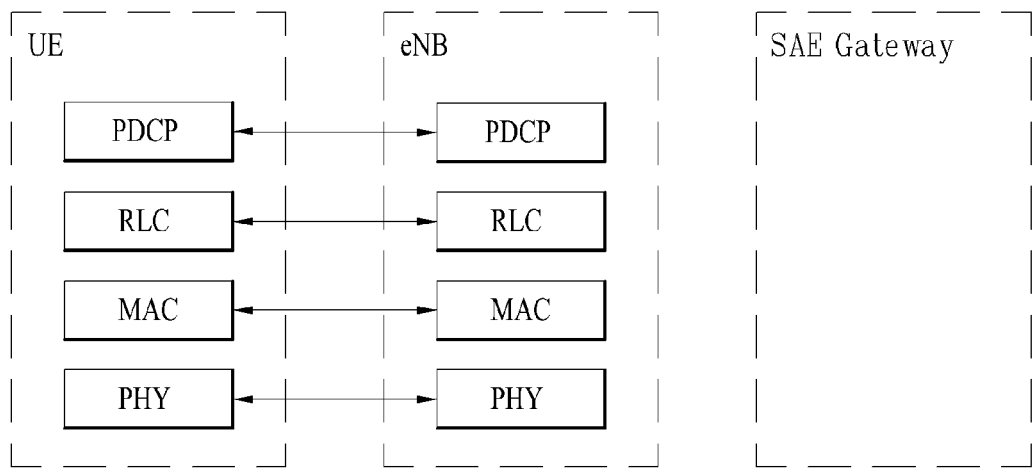
(b) User-plane protocol stack FIG. 5
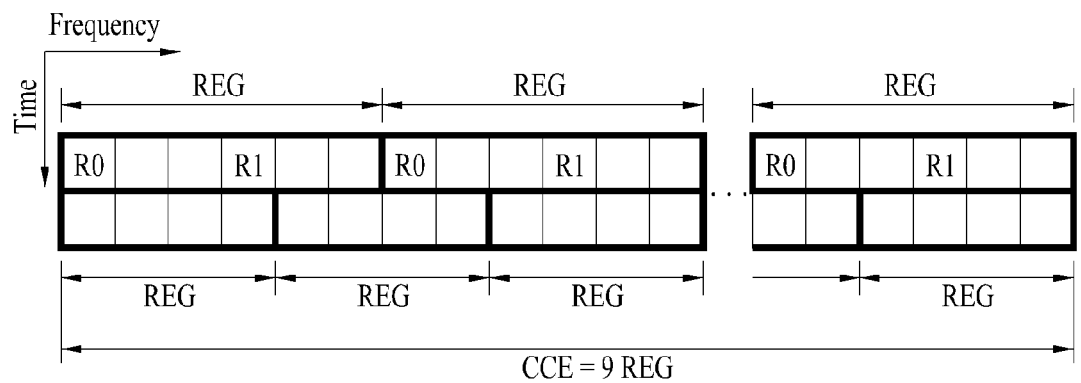
(a) 1 Tx or 2 Tx
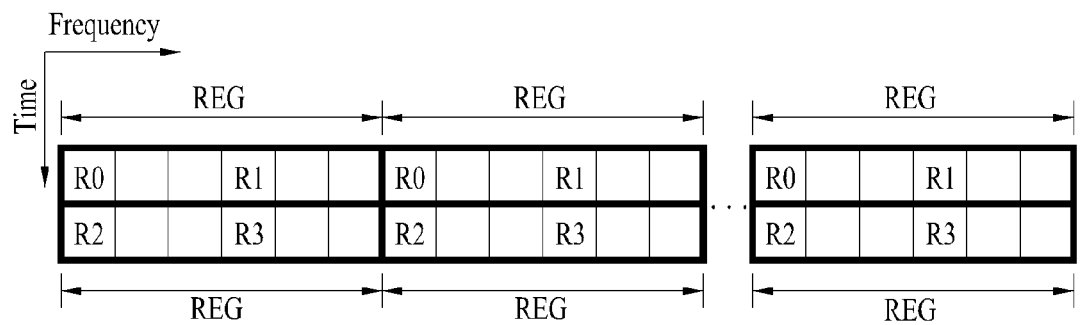
(b) 4 Tx

FIG. 23 before being re-indexed ECCE

| 0 | 4 | 8  | 12 | 16 | 20 | 24 | 28 |
|---|---|----|----|----|----|----|----|
| 1 | 5 | 9  | 13 | 17 | 21 | 25 | 29 |
| 2 | 6 | 10 | 14 | 18 | 22 | 26 | 30 |
| 3 | 7 | 11 | 15 | 19 | 23 | 27 | 31 |

Re-indexed ECCE

| 0  | 1  | 2  | 3  | 4  | 5  | 6  | 7  |
|----|----|----|----|----|----|----|----|
| 8  | 9  | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |

FIG. 26
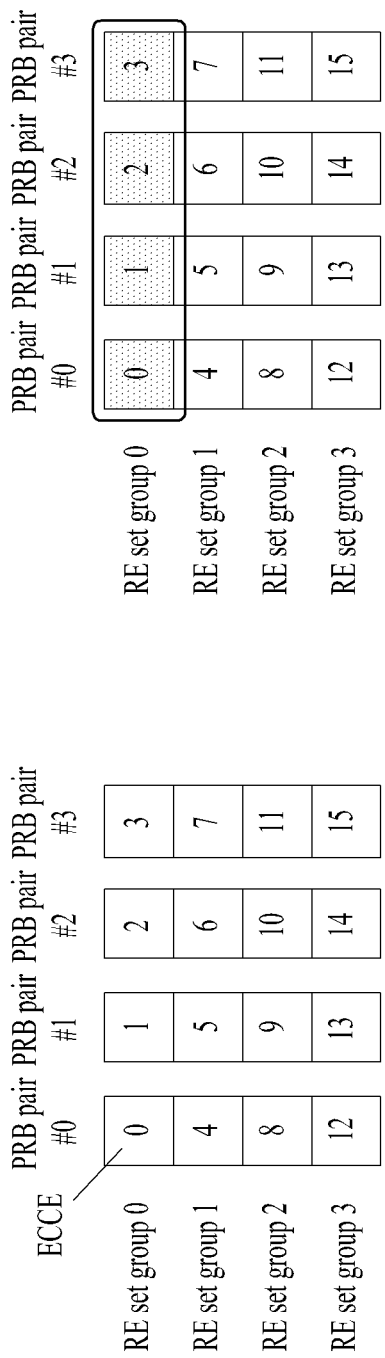
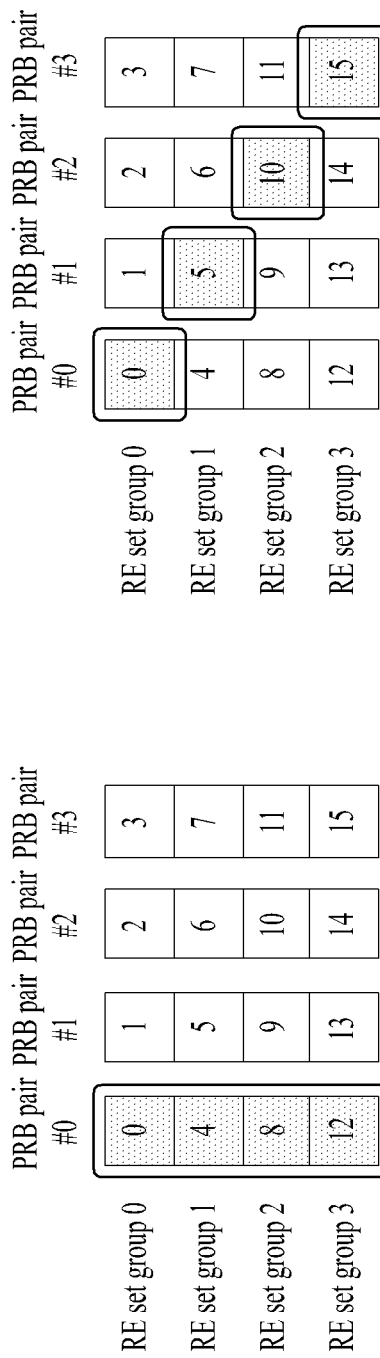

Localized EPDCCH candidates corresponding to aggregation level 1

(a)

Localized EPDCCH candidates corresponding to aggregation level 1

(b)

US 9,497,752 B2

METHOD FOR FORMING RESOURCE BLOCK FOR SEARCH REGION IN DISTRIBUTION-TYPE DOWNLINK CONTROL CHANNEL IN WIRELESS COMMUNICATION SYSTEM, AND APPARATUS THEREFOR

CROSS REFERENCE TO RELATED APPLICATIONS

This application is the National Phase of PCT/KR2013/002717 filed on Apr. 2, 2013, which claims priority under 35 U.S.C. 119(e) to U.S. Provisional Application No. 61/619,396 filed on Apr. 2, 2012, U.S. Provisional Application No. 61/623,583 filed on Apr. 13, 2012, U.S. Provisional Application No. 61/648,040 filed on May 16, 2012, U.S. Provisional Application No. 61/650,418 filed on May 22, 2012, U.S. Provisional Application No. 61/673,737 filed on Jul. 20, 2012, U.S. Provisional Application No. 61/679,060 filed on Aug. 2, 2012, U.S. Provisional Application No. 61/706,796 filed on Sep. 28, 2012, U.S. Provisional Application No. 61/709,977 filed on Oct. 4, 2012, and under 35 U.S.C. 119(a) to Patent Application No. 10-2013-0035132 filed in Republic of Korea on Apr. 1, 2013, all of which are hereby expressly incorporated by reference into the present application.

TECHNICAL FIELD

The present invention relates to a wireless communication system and, more specifically, to a method for forming a resource block for a distributed downlink control channel search space in a wireless communication system and an apparatus therefor.

BACKGROUND ART

A brief description will be given of a 3$^{rd}$ Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously for broadcast service, multicast service, and/or unicast service.

A single eNB manages one or more cells. A cell is set to operate in one of the bandwidths of 1.44, 3, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency region in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency region in which the UE can transmit data, a coding scheme, a data size, HARQ information, etc. by transmitting UL scheduling information to the UE. An interface for transmitting user traffic or control traffic may be used between eNBs. A Core Network (CN) may include an AG and a network node for user registration of UEs. The AG manages UE mobility on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, new technological evolution is required to achieve future competitiveness. Specifically, cost reduction per bit, increased service availability, flexible use of frequency bands, simplified structure, an open interface, appropriate power consumption of UEs, etc. are required.

DISCLOSURE

Technical Problem

An object of the present invention devised to solve the problem lies in a method for forming a resource block for a distributed downlink control channel search space in a wireless communication system and an apparatus therefor.

Technical Solution

In an aspect of the present invention, a method for receiving an EPDCCH (Enhanced Physical Downlink Control Channel) from a base station by a user equipment (UE) in a wireless communication system including: defining a first number of EREGs (Enhanced Resource Element Groups) in each of resource blocks for the EPDCCH; and receiving the EPDCCH by monitoring EPDCCH candidates comprising one or more ECCEs (Enhanced Control Channel Elements) in the resource blocks, wherein each of the one or more ECCEs comprises a second number of EREGs included in different resource blocks, wherein indexes of the different resource blocks including the second number of EREGs are determined based on a specific value obtained by dividing a number of resource blocks by the second number.

In another aspect of the present invention, a method for transmitting, by a base station, an EPDCCH to a UE in a wireless communication system includes: defining a first number of EREGs each of resource blocks for the EPDCCH; and transmitting the EPDCCH using one or more ECCEs comprising a second number of EREGs included in different resource blocks, wherein indexes of the resource blocks including the second number of EREGs are determined based on a specific value obtained by dividing a number of resource blocks by the second number.

In the aforementioned aspects of the present invention, the indexes of the different resource blocks including the second number of EREGs may have an interval being a larger value between 1 and the specific value. That is, the indexes of the different resource blocks including the second number of EREGs may be determined by Expression A.

$$(n+j\max)(1, N_{RB}^{S_m}/N_{ECCE}^{EREG}))\bmod N_{RB}^{S_m} \quad \text{<Expression A>}$$

(where n is an ECCE index, $N_{RB}^{ECCE}$ indicates the number of ECCEs per resource block, j=0, 1, . . . , $N_{ECCE}^{EREG}-1$, $N_{ECCE}^{EREG}$ indicates the second number, and $N_{RB}^{Sm}$ B indicates the number of resource blocks)

Furthermore, the indexes of the second number of EREGs forming the ECCE #n may be determined by Expression B.

$$\lfloor n/N_{RB}^{Sm} \rfloor + jN_{RB}^{ECCE} \qquad \text{<Expression B>}$$

(where $N_{RB}^{ECCE}$ indicates the number of ECCEs per resource block, j=0, 1, . . . , $N_{ECCE}^{EREG}-1$, $N_{ECCE}^{EREG}$ indicates the second number, and $N_{RB}^{Sm}$ indicates a number of resource blocks)

The first number may be a fixed value and the second number may be a value varying according to a type of a subframe through which the EPDCCH is transmitted. Specifically, the second number may be 4 or 8 according to a type of a subframe through which the EPDCCH is transmitted.

More preferably, the defining the first number of EREGs may include allocating indexes of the EREGs to each of the resource blocks, wherein the indexes of the EREGs included in each of the resource blocks have values in the range of 0 to 15.

Advantageous Effects

According to embodiments of the present invention, it is possible to efficiently form a resource block for a distributed type downlink control channel search space in a wireless communication system.

The effects of the present invention are not limited to the above-described effects and other effects which are not described herein will become apparent to those skilled in the art from the following description.

DESCRIPTION OF DRAWINGS

FIG. 2 illustrates a control-plane protocol stack and a user-plane protocol stack in a radio interface protocol architecture conforming to a 3GPP radio access network standard between a UE and an E-UTRAN;

FIG. 5 illustrates resource units used to configure a downlink control channel in LTE;

FIG. 23 illustrates an example of re-indexing ECCEs according to a fifth embodiment of the present invention;

FIG. 26 illustrates an example of determining methods of multiplexing an L-ECCE and a D-ECCE and then determining a starting position for EPDCCH candidates in a search space according to the sixth embodiment of the present invention;

FIG. 29 illustrates mapping between ECCEs and EREGs according to a seventh embodiment of the present invention;

FIG. 31 illustrates exemplary arrangement of localized EPDCCH candidates at aggregation level 1 according to the seventh embodiment of the present invention;

BEST MODE

Figure 1:
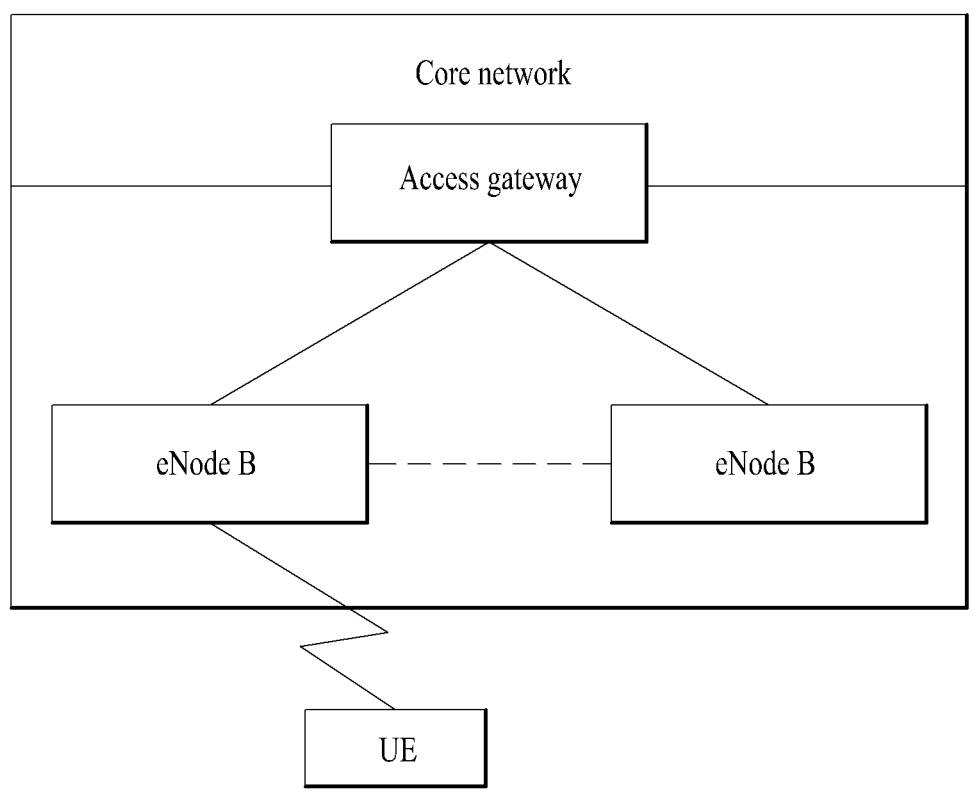
FIG. 1 illustrates a configuration of an E-UMTS network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to 3GPP.

While embodiments of the present invention are described in the context of LTE and LTE-A, these embodiments are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a UE and an E-UTRAN. The control plane is a path along which the UE and the E-UTRAN transmit control messages to manage calls, and the user plane is a path along which data generated from an application layer, for example, voice data or Internet packet data is transmitted.

A physical (PHY) layer at Layer 1 (L1) provides information transfer service to a higher layer using physical channels. The PHY layer is connected to a medium access control (MAC) layer, which is a higher layer, via transport channels (transantenna port channels). The transport channels deliver data between the MAC layer and the PHY layer. Data is transmitted on physical channels between the PHY layers of a transmitter and a receiver. The physical channels use time and frequency as radio resources. Specifically, the physical channels are modulated using Orthogonal Frequency Division Multiple Access (OFDMA) for downlink and using Single Carrier Frequency Division Multiple Access (SC-FDMA) for uplink.

The MAC layer at Layer 2 (L2) provides service to a higher layer, i.e. a Radio Link Control (RLC) layer, via logical channels. The RLC layer at L2 supports reliable data transmission. RLC functionality may be implemented in a functional block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. An RB refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transport channels used to deliver data from the network to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
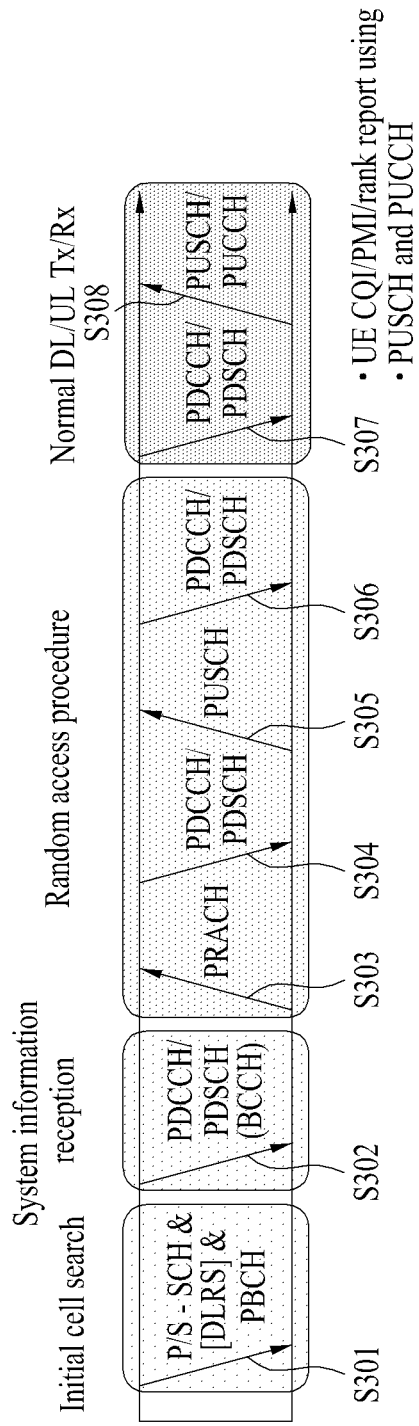
FIG. 3 illustrates physical channels used in a 3GPP system and a general signal transmission method using the physical channels.

FIG. 3 illustrates physical channels used in 3GPP and a general method for transmitting signals on the physical channels.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During initial cell search, the UE may monitor a DL channel state by receiving a DownLink Reference Signal (DL RS).

After initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on UL or receives from the eNB on DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In 3GPP LTE, the UE may transmit control information such as a CQI, a PMI, an RI, etc. on a PUSCH and/or a PUCCH.

Figure 4:
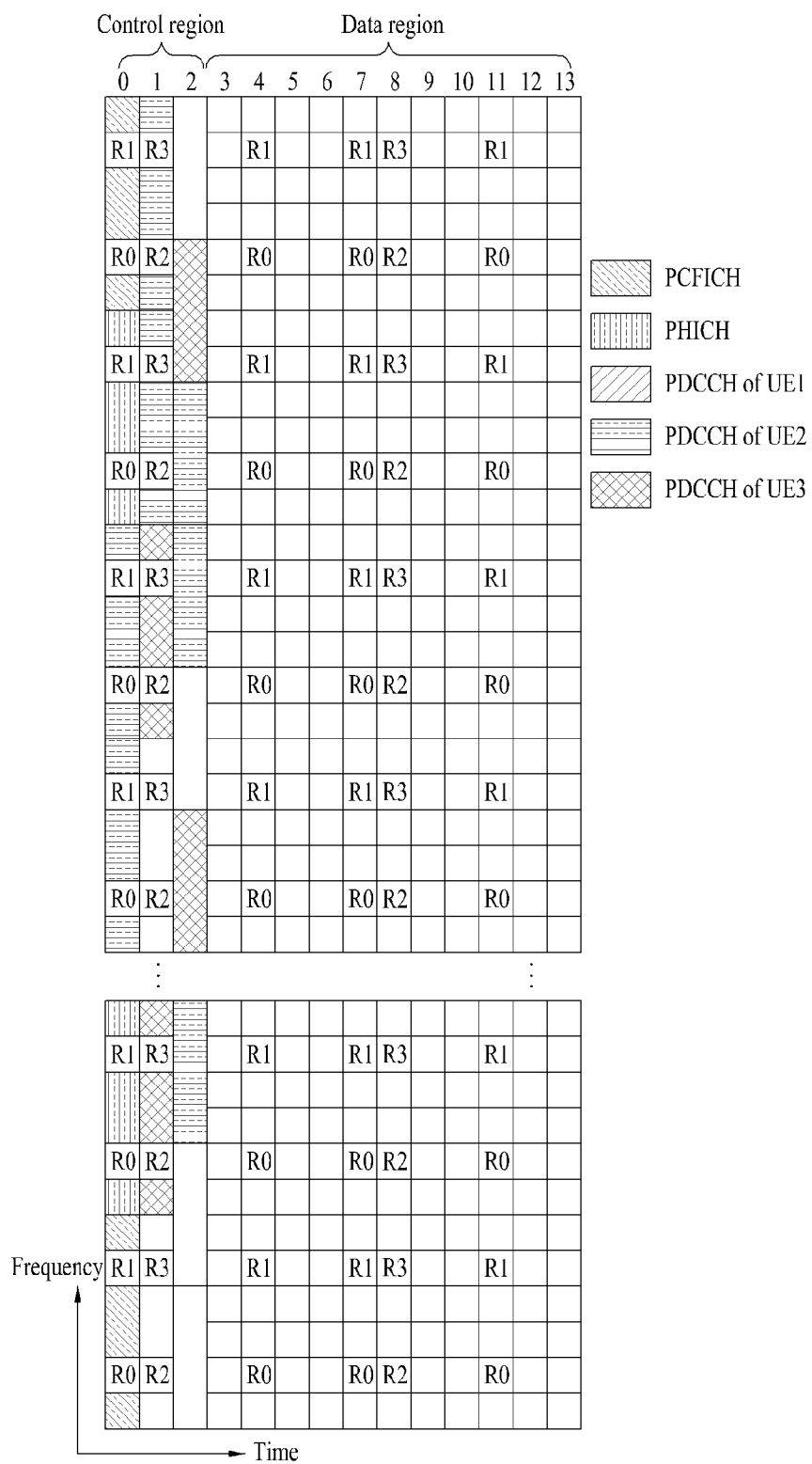
FIG. 4 illustrates a structure of a downlink radio frame used in LTE.

FIG. 4 illustrates control channels included in the control region of a subframe in a downlink radio frame.

Referring to FIG. 4, a subframe includes 14 OFDM symbols. A control region occupies the first one to three OFDM symbols and a data region occupies the other 13 to 11 OFDM symbols in the subframe according to the configuration of the subframe. In FIG. 4, reference characters R1 to R4 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator Channel (PCFICH), a Physical Hybrid-ARQ Indicator Channel (PHICH), a Physical Downlink Control Channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated using Quadrature Phase Shift Keying (QPSK), ranges from 1 to 3 or from 2 to 4 according to a bandwidth.

The PHICH carries HARQ ACK/NACK for uplink transmission. That is, the PHICH is a channel used to deliver HARQ ACK/NACK for uplink HARQ. The PHICH includes one REG and is scrambled cell-specifically. The ACK/NACK is indicated in one bit and modulated using Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. The same PHICH (group) occurs three times to achieve a diversity gain in the frequency and/or time domain.

A PDCCH is allocated to the first n OFDM symbols of a subframe. Here, n is 1 or a larger integer indicated by the PCFICH. The PDCCH includes one or more Control Channel Elements (CCEs). The PDCCH is used to inform a UE or a UE group of the resource allocation of transport channels, namely a PCH and a DownLink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, then UEs within the cell of the eNB monitor the PDCCH using their RNTI information. If one or more UEs have RNTI "A", then the UEs receive the PDCCH and receive a PDSCH indicated by "B" and "C" based on the received information of the PDCCH.

FIG. 5 illustrates resource units used to configure a downlink control channel in LTE. FIG. 5(a) shows a case in which the number of transmit (Tx) antennas is 1 or 2 and FIG. 5(b) shows a case in which the number of Tx antenna is 4. Although a different RS pattern is used according to the number of Tx antennas, REs are configured for a DL control channel in the same manner.

Referring to FIG. 5, a basic resource unit of a DL control channel is an REG. The REG includes four contiguous REs except for REs carrying RSs. REGs are marked with bold lines in FIG. 5. A PCFICH and a PHICH include 4 REGs and 3 REGs, respectively. A PDCCH is configured in units of a control channel element (CCE), each CCE including 9 REGs.

To determine whether a PDCCH including L CCEs is transmitted to a UE, the UE is configured to monitor $M^{(L)}$ ($\geq L$) CCEs that are arranged contiguously or according to a predetermined rule. L that the UE should consider for PDCCH reception may be a plural value. CCE sets that the UE should monitor to receive a PDCCH are referred to as a search space. For example, LTE defines search spaces as illustrated in Table 1.

TABLE 1

| | Search space $S_k^{(L)}$ | | Number of |
|---|---|---|---|
| Type | Aggregation level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In Table 1, L is a CCE aggregation level, that is, the number of CCEs in a PDCCH, $S_k^{(L)}$ is a search space with CCE aggregation level L, and $M^{(L)}$ is the number of candidate PDCCHs to be monitored in the search space with CCE aggregation level L.

Search spaces are classified into a UE-specific search space accessible only by a specific UE and a common search space accessible by all UEs within a cell. A UE monitors common search spaces with CCE aggregation levels 4 and 8 and UE-specific search spaces with CCE aggregation levels 1, 2, 4, and 8. A common search space and a UE-specific search space may overlap each other.

For each CCE aggregation level, the position of the first CCE (a CCE having the smallest index) of a PDCCH search space allocated to a UE changes every subframe. This is called PDCCH search space hashing.

A CCE may be distributed across a system band. More specifically, a plurality of logically contiguous CCEs may be input to an interleaver and the interleaver may permute the sequence of the input CCEs on an REG basis. Accordingly, the time/frequency resources of one CCE are distributed physically across the total timefrequency region of the control region of a subframe. As a control channel is configured in units of a CCE but interleaved in units of an REG, frequency diversity gain and interference randomization gain may be maximized.

Figure 6:
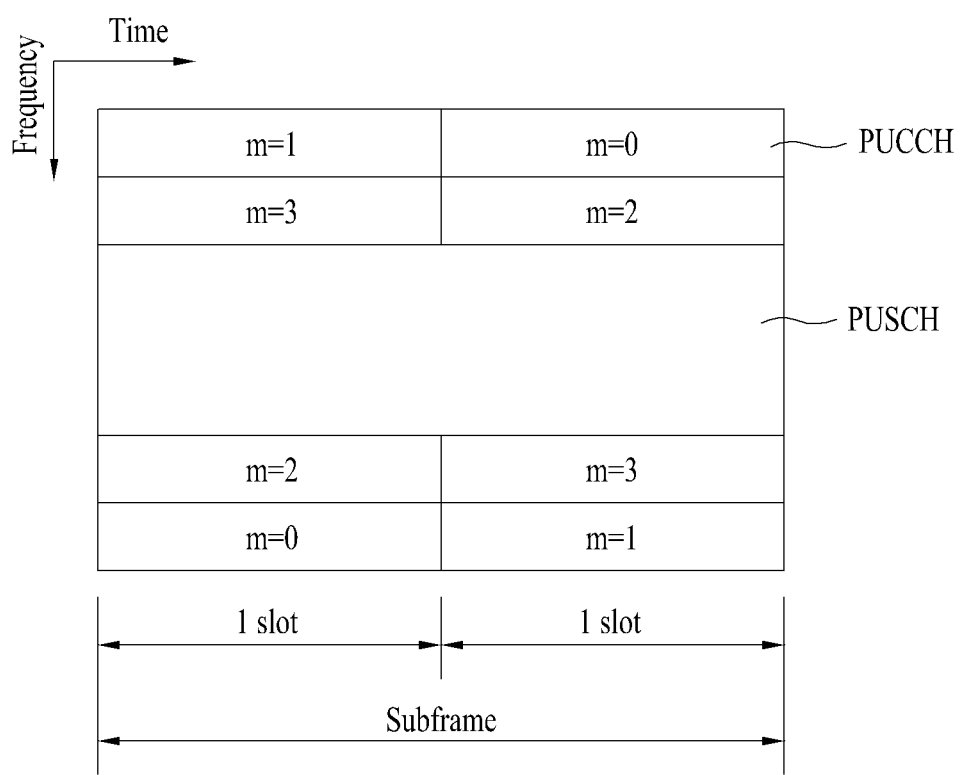
FIG. 6 illustrates a structure of an uplink subframe used in LTE.

FIG. 6 illustrates a structure of a UL subframe in LTE.

Referring to FIG. 6, a UL subframe may be divided into a region to which a physical uplink control channel (PUCCH) carrying control information is allocated and a region to which a physical uplink shared channel (PUSCH) carrying user data is allocated. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, and a scheduling request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
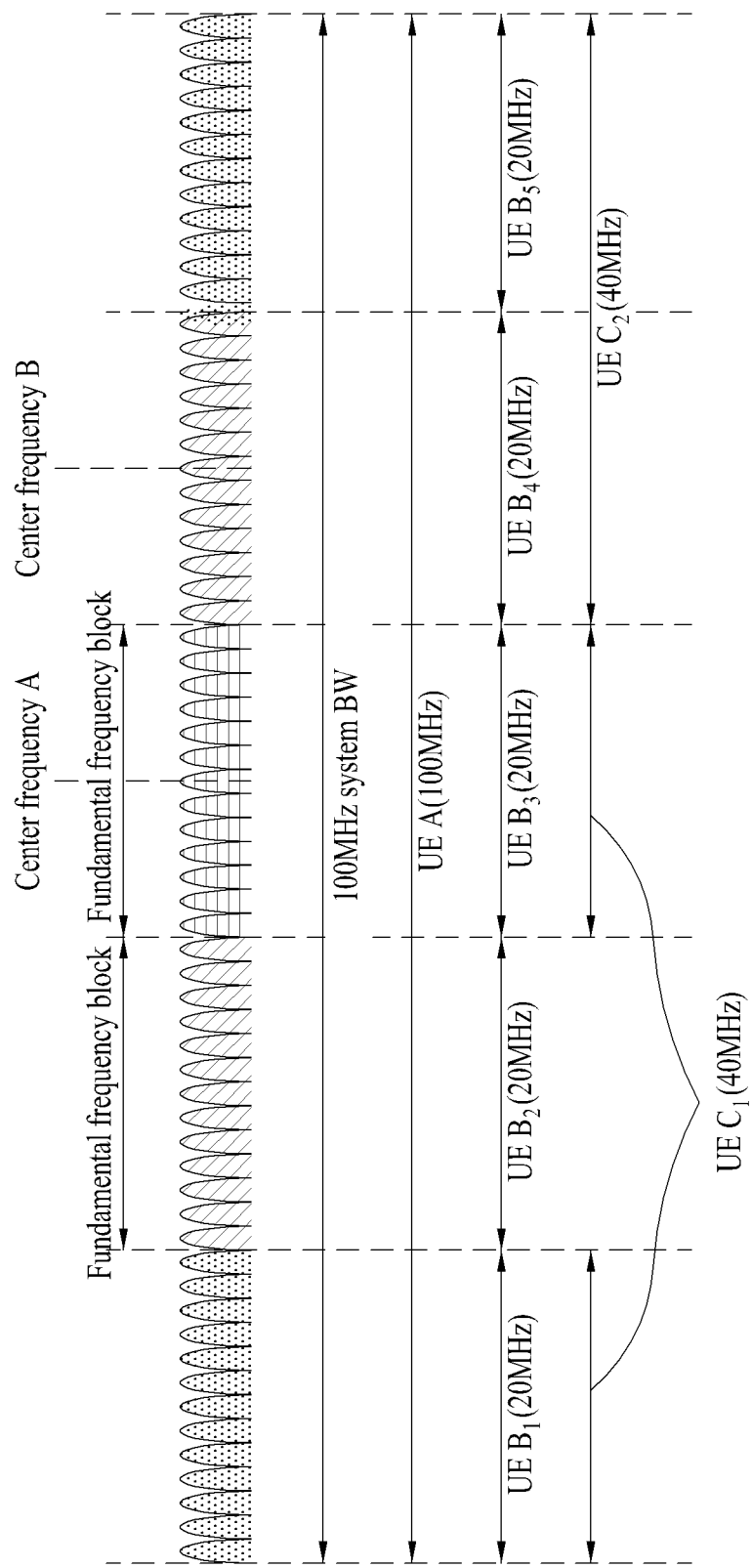
FIG. 7 illustrates carrier aggregation.

FIG. 7 illustrates carrier aggregation.

Carrier aggregation refers to a scheme in which a UE uses a plurality of frequency blocks or (logical) cells composed of UL resources (or component carriers) and/or DL resources (or component carriers) as one wider logical frequency band. According to carrier aggregation, a wireless communication can use a use a wider frequency band. Resources are represented by the term "component carrier" for convenience of description in the following.

Referring to FIG. 7, system bandwidth (BW) is a logical band having a bandwidth of up to 100 MHz. The system bandwidth includes 5 component carriers each of which has a bandwidth of up to 20 MHz. A component carrier includes one or more physically contiguous subcarriers. While the component carriers have the same bandwidth in FIG. 7, the component carriers may have different bandwidths. Furthermore, while the component carriers are contiguous in the frequency domain, FIG. 7 illustrates the logical concept and thus the component carriers may be physically contiguous or separated.

Different center frequencies may be respectively used for the component carriers or a common center frequency may be used for physically contiguous component carriers. For example, if all component carriers are physically contiguous in FIG. 7, then a center frequency A can be used. When the component carriers are not physically contiguous, center frequencies A and B may be used.

A component carrier may correspond to the system bandwidth of a legacy system in the specification. It is possible to easily provide backward compatibility and facilitate system design in a wireless communication environment in which an enhanced UE and a legacy UE coexist by defining the component carrier on the basis of the legacy system. For example, when an LTE-A system supports carrier aggregation, each component carrier can correspond to the system bandwidth of an LTE system. In this case, a component carrier can have one of the bandwidths of 1.25, 2.5, 5, 10 and 20 MHz.

When total system bandwidth is extended according to carrier aggregation, 100 MHz can be used for communication with each UE and communication is performed using all 5 component carriers. UEs $B_1$ to $B_5$ may use only the bandwidth of 20 MHz and performs communication using one component carrier. UEs $C_1$ and $C_2$ may use 40 MHz and performs communication using two component carriers, respectively. These two component carriers may be logically/physically contiguous or noncontiguous. UE $C_1$ corresponds to a case in which two noncontiguous component carriers are used and UE $C_2$ corresponds to a case in which two contiguous component carriers are used.

One DL component carrier and one UL component carrier are used in LTE, whereas a plurality of component carriers may be used in LTE-A, as shown in FIG. 6. Methods for a control channel to schedule a data channel can be divided into linked carrier scheduling and cross carrier scheduling.

More specifically, according to linked carrier scheduling, a control channel transmitted through a specific component carrier schedules only a data channel through the specific component carrier as in the LTE system which uses a single component carrier.

According to cross carrier scheduling, a control channel transmitted through a primary component carrier (CC) schedules a data channel transmitted through the primary CC or another CC using a carrier indicator field (CIF).

In the current wireless communication environment, data throughput for a cellular network is rapidly increasing with the emergence and propagation of various devices requiring M2M (machine-to-machine) communication and high data throughput. To meet high data throughput, communication technology evolves to carrier aggregation for enabling efficient use of a larger number of frequency bands, MIMO for increasing data capacity within a limited frequency band, and coordinated multi-point (CoMP) and communication environments evolves to an environment in which the density of accessible nodes around a UE increases. A system having high-density nodes can show higher system performance according to cooperation among nodes. This scheme provides much higher performance than a scheme in which nodes operate as independent base stations (BSs) (which may be called advanced BSs (ABSs), Node-Bs (NBs), eNode-Bs (eNBs), access points (APs), etc.).

Figure 8:
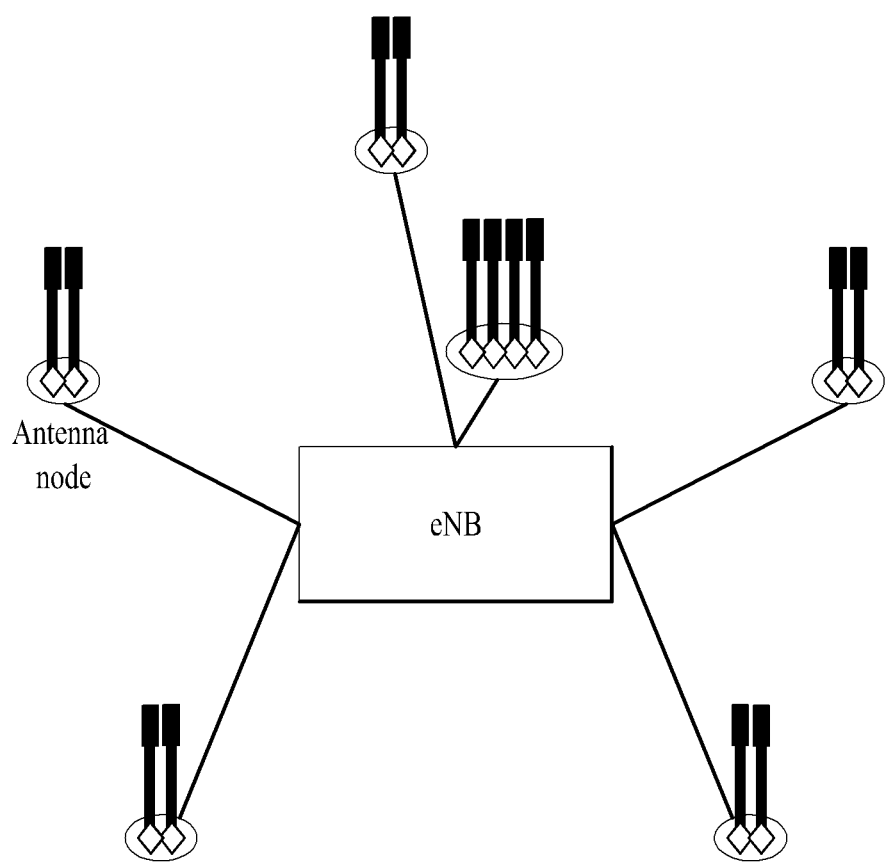
FIG. 8 illustrates a multi-node system from among next-generation communication systems.

FIG. 8 illustrates a multi-node system from among next-generation communication systems.

Referring to FIG. 8, when transmission and reception of all nodes are managed by one controller and thus the nodes operates as an antenna group of one cell, the system can be regarded as a distributed multi-node system (DMNS) which forms one cell. The individual nodes may be assigned respective node IDs or may operate as antennas in the cell without having node IDs. However, if the nodes have different cell identifiers IDs, then the system can be regarded as a multi-cell system. When multiple cells are configured in an overlapping manner according to coverage, this is called a multi-tier network.

A Node-B, eNode-B, PeNB, HeNB, RRH (Remote Radio Head), relay and distributed antenna can be a node and at least one antenna is installed in one node. A node may be called a transmission point. While nodes generally refer to a group of antennas spaced by a predetermined distance or more, nodes can be applied to the present invention even if the nodes are defined as an arbitrary antenna group irrespective of distance.

With the introduction of the aforementioned multi-node system and relay nodes, various communication schemes can be applied to improve channel quality. To apply MIMO and CoMP to multi-node environments, however, introduction of a new control channel is needed. Accordingly, an enhanced PDCCH (EPDCCH) is newly introduced as a control channel. The EPDCCH is allocated to the data region (referred to as a PDSCH region hereinafter) instead of the control region (referred to as a PDCCH region). Since control information about a node can be transmitted to each UE through the EPDCCH, PDCCH region shortage can be solved. For reference, the EPDCCH is not provided to legacy UEs and can be received only by LTE-A UEs. In addition, the EPDCCH is transmitted and received on the basis of a DM-RS (or CSI-RS) instead of a CRS corresponding to a cell-specific reference signal.

Figure 9:
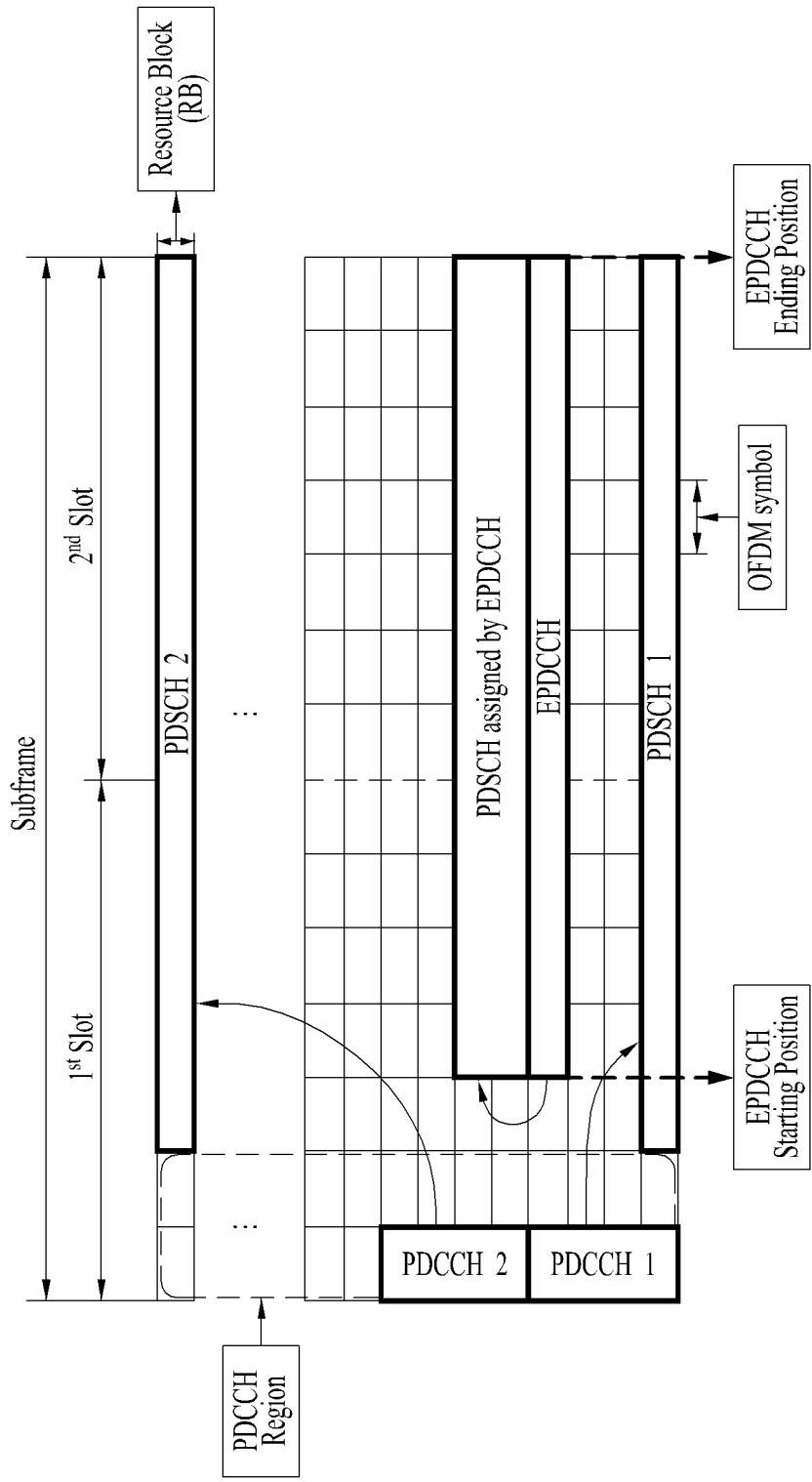
FIG. 9 illustrates an EPDCCH and a PDSCH scheduled by the EPDCCH.

FIG. 9 illustrates an example of an EPDCCH and a PDSCH scheduled by the EPDCCH.

Referring to FIG. 9, PDCCH 1 and PDCCH 2 respectively schedule PDSCH 1 and PDSCH 2 and the EPDCCH schedules another PDSCH. FIG. 9 shows that the EPDCCH is transmitted, starting from the fourth symbol of the corresponding subframe to the last symbol.

EPDCCHs can be transmitted through the PDSCH region used to transmit data and a UE monitors EPDCCH candidates in order to detect presence or absence of an EPDCCH destined therefor. That is, to obtain DCI included in the EPDCCH, the UE needs to perform blind decoding for a predetermined number of EPDCCH candidates in a search space with aggregation level L. Like the aggregation level of the search space for the PDCCH, the aggregation level of the search space for the EPDCCH refers to the number of enhanced CCE (ECCEs) used to transmit DCI.

ECCEs constituting an EPDCCH can be classified into a localized ECCE (referred to as L-ECCE hereinafter) and a distributed ECCE (referred to as D-ECCE hereinafter) according to a method of mapping corresponding REs. In the case of L-ECCE, REs constituting an ECCE are extracted from the same PRB pair. The L-ECCE has an advantage that beamforming optimized for each UE can be performed. In the case of D-ECCE, REs constituting an ECCE are extracted from different PRB pairs. The D-ECCE has an advantage that frequency diversity can be used although beamforming is restricted.

Figure 10:
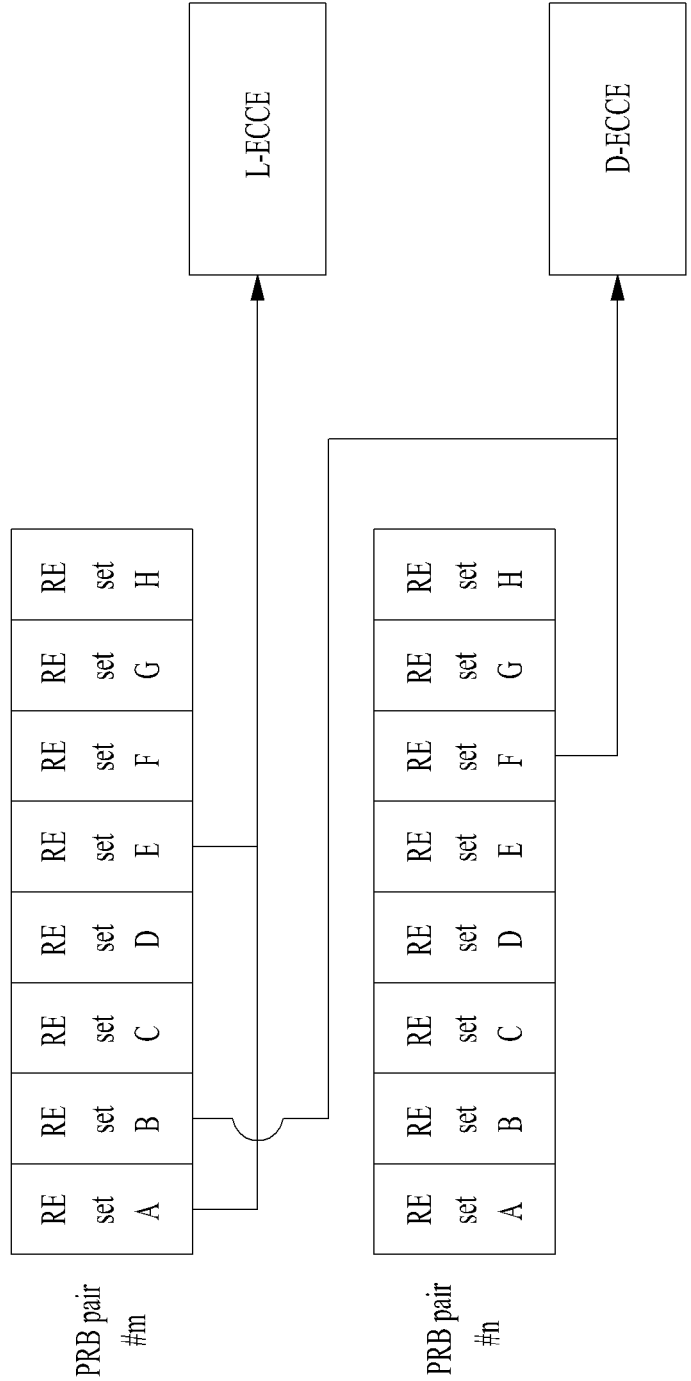
FIG. 10 illustrates the concepts of a localized ECCE and a distributed ECCE.

FIG. 10 is a view for explaining the concepts of the localized ECCE (L-CCE) and the distributed ECCE (E-ECCE). In FIG. 10, an L-ECCE and a D-ECCE are configured using two PRB pairs and it is assumed that one PRB pair is divided into 8 RE sets, the L-ECCE is formed using two RE sets belonging to one PRB pair and the D-ECCE is formed using two RE sets respectively belong to the two PRB pairs.

Referring to FIG. 10, RE sets A and E of PRB pair #m are grouped to define one L-ECCE and RE set B of PRB pair #m and RE set F of PRB pair #n are grouped to defined one D-ECCE. In the following description, the present invention is not limited to the example shown in FIG. 10 and may include a case in which one PRB pair is divided into an arbitrary number of RE sets and a case in which one D-ECCE is formed using an arbitrary number of PRB pairs.

An EPDCCH is transmitted in a predetermined PRB pair and a search space of the EPDCCH is defined using the PRB pair. Since a search space needs to be configured by extracting RE sets from two or more RPB pairs in the case of D-ECCD, a UE needs to be able to know a PRB pair including RE sets forming each D-ECCE and positions of the RE sets in the PRB pair. Although an eNB may designate RE sets forming each D-ECCE through a higher layer signal, this causes excessive signaling overhead.

The present invention proposes a method of configuring an ECCE without excessive signaling overhead. It is assumed that one ECCE is composed of K RE sets, one PRB pair is composed of P ECCEs and thus one PRB pair is divided into K×P RE sets for convenience of description. On this assumption, a total of N×K×P RE sets is defined when N PRB pairs are used and N×P ECCEs can be defined using the RE sets. An RE set may be referred to as an enhanced resource element group (EREG).

A set of PRB pairs to be used by the EPDCCH may be signaled using a higher layer signal. PRB pairs set for the EPDCCH may be indexed. For example, indices can be sequentially allocated to PRB pairs, starting from index 0 allocated to a PRB pair having a lowest index, and index N−1 can be allocated to a PRB pair having a highest index. Similarly, indices 0~(N×P×K)−1 can be respectively allocated to RE sets and indices (N×P)−1 can be respectively allocated to ECCEs.

RE set indices may be determined in a PRB pair according to a specific rule. Since the number of REs that can be allocated to the EPDCCH can be changed according to subframe configuration, a PRB pair may not be partitioned into RE sets having the same size. In this case, if RE sets having the same size or similar sizes are grouped, then consecutive indices can be allocated to RE sets belonging to the same group or alternately allocated to RE sets belonging to different groups.

Figure 11:
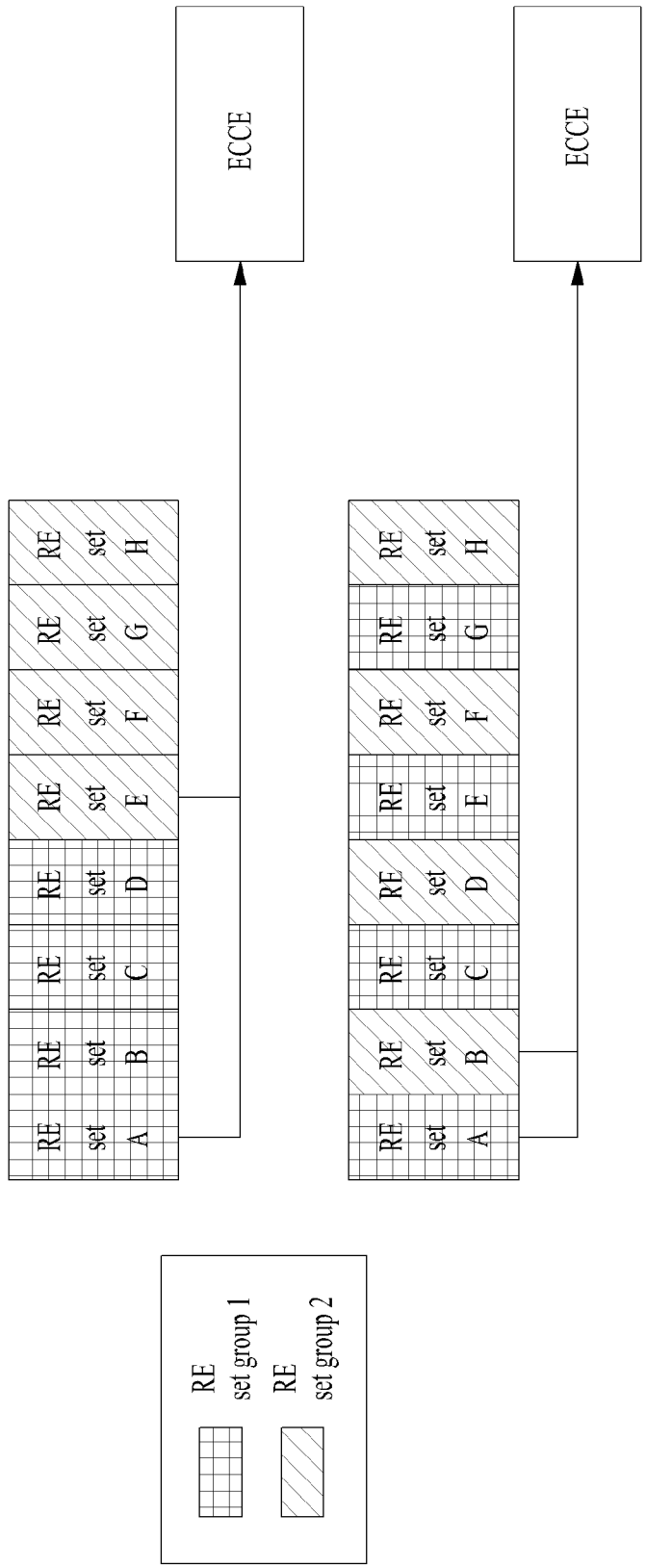
FIG. 11 illustrates an example of selecting RE sets for forming an ECCE from a plurality of RE set groups.

FIG. 11 illustrates an example of selecting RE sets for forming an ECCE from a plurality of RE set groups. The upper part of FIG. 11 shows an example of allocating consecutive indices to RE sets belonging to the same group and the lower part shows an example of alternately allocating consecutive indices to RE sets belonging to different groups.

Referring to FIG. 11, when the ECCE is formed using RE sets belonging to different groups, unevenness of RE sets according to PRB pair partitioning or imbalance of the numbers of REs in PRB pairs can be solved.

However, when consecutive indices are allocated to RE sets belonging to the same group, that is, in the case of the upper part of FIG. 11, a rule of considering a spacing between RE sets is needed when predetermined RE sets are selected to form an ECCE. On the other hand, when consecutive indices are alternately allocated to RE sets belonging to different groups, that is, in the case of the lower part of FIG. 11, an ECCE can be configured using consecutive RE sets without the rule. The present invention considers mapping schemes for both cases.

First Embodiment

A first embodiment of the present invention proposes a method of configuring an ECCE by aggregating RE sets spaced apart by a predetermined interval.

A description will be given of a method of defining an ECCE when ECCE #n is designated as an L-ECCE.

Since K RE sets (i.e. EREGs) selected from a single PRB pair are necessary for L-ECCE #n, it is appropriate to use RE sets belonging to ($\lfloor n/P \rfloor$)-th PRB pair when RE sets are sequentially indexed per PRB pair. Here, $\lfloor \varnothing x \rfloor$ is a function that indicates a minimum integer less than or equal to x.

For example, L-ECCE #n is formed by selecting K RE sets belonging to the ($\lfloor n/P \rfloor$)-th PRB pair, that is, n−P·$\lfloor n/P \rfloor$, n−P·$\lfloor n/P \rfloor$+P, n−P·$\lfloor n/P \rfloor$+2P, ..., n−P·$\lfloor n/P \rfloor$+(K−1)·P RE sets in the corresponding PRB pair. Here, n−P·$\lfloor n/P \rfloor$ can be represented as n mod P since n−P·$\lfloor n/P \rfloor$ equals a remainder obtained by dividing n by P. In other words, when the index of the L-ECCE is #n, an RE set corresponding to n−P·$\lfloor n/P \rfloor$=n mod P in PRB pair #$\lfloor n/P \rfloor$ is set as a reference RE set and a total of K RE sets is selected while P is added to RE set indices in the PRB pair, starting from the reference RE set index, to thereby form the L-ECCE.

If indices are sequentially assigned to all RE sets defined from N PRB pairs, then indices of RE sets occupied by L-ECCE #n are n+P·(K−1)·$\lfloor n/P \rfloor$, n+P·(K−1)·$\lfloor n/P \rfloor$+P, n+P·(K−1)·$\lfloor n/P \rfloor$+2P, ..., n+P·(K−1)·$\lfloor n/P \rfloor$+(K−1)·P.

Figure 12:
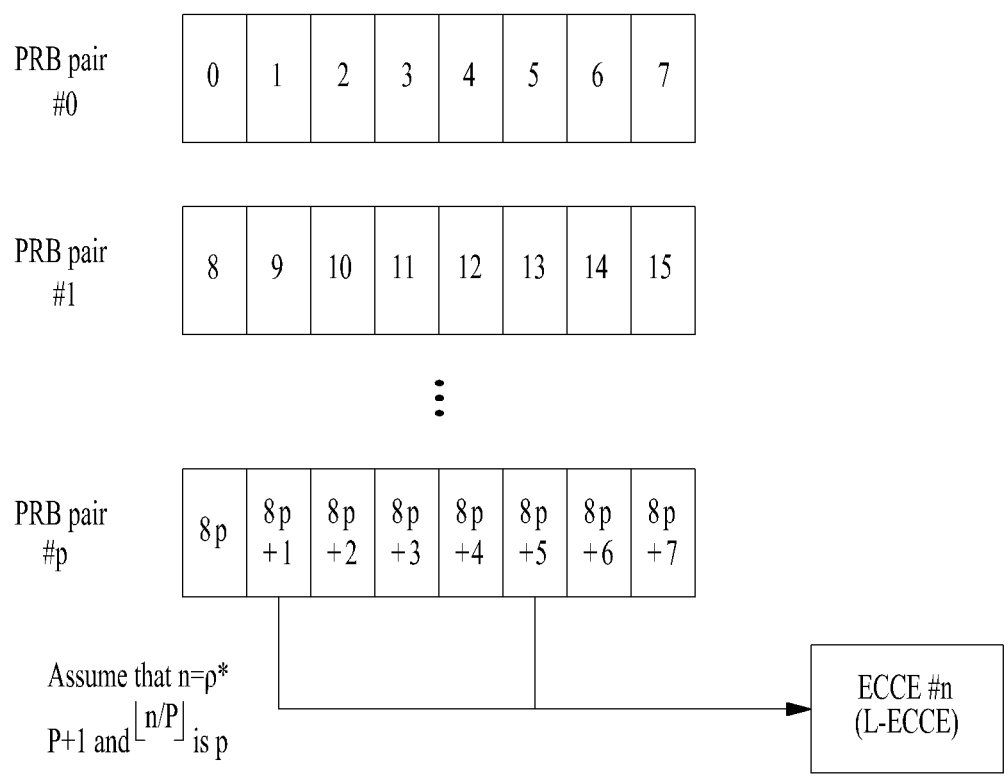
FIG. 12 illustrates an example of defining an ECCE when the ECCE is designated as an L-ECCE according to a first embodiment of the present invention.

FIG. 12 illustrates an example of defining an ECCE when the ECCE is designated as an L-ECCE according to the first embodiment of the present invention. In FIG. 12, it is assumed that the number K of RE sets, which form the ECCE, is 2 and the number P of ECCEs, which are configured in one PRB pair, is 4. That is, it is assumed that the number of RE sets configured in one PRB pair is 8. $\lfloor n/P \rfloor$ is represented as p for simplicity.

Referring to FIG. 12, an L-ECCE having an index of #n=p×P+1 is selected from PRB pair #p, RE set #(n+P·(K−1)·$\lfloor n/P \rfloor$=(p×4+1)+4×1×p=8p+1) is selected as a reference RE set and RE set #8p+5 is selected by adding an RE set index spacing P=4 to the index of the reference RE set.

A description will be given of a method of defining an ECCE when ECCE #n is designated as a D-ECCE.

Since a D-ECCE occupies only one RE set in one PRB pair and a maximum of K−1 RE sets finally remain in the PRB pair even when every K RE sets are grouped to form an L-ECCE, it is desirable to allocate K−1 RE sets to the D-ECCE. This may mean that D-ECCEs have a correlation therebetween. Accordingly, the present invention proposes a method of configuring a specific D-ECCE by selecting RE sets from PRB pairs associated with a specific PRB pair #n when RE sets belonging to the PRB pair #n are used for the specific D-ECCE.

As an exemplary method of associating PRB pairs, a PRB pair having an index, which is obtained by adding a predetermined offset to an index of a specific PRB pair, can be set as a PRB pair associated with the specific PRB pair. More specifically, when a total of N PRB pairs are set and it is assumed that one D-ECCE is composed of K RE sets, PRB pair #p can be regarded as being associated with PRB pair #

$$\left(p + \left\lfloor \frac{N}{K} \right\rfloor\right),$$

PRB pair #

$$\left(p + 2 \cdot \left\lfloor \frac{N}{K} \right\rfloor\right),$$

..., PRB pair #

$$\left(p + (K-1) \cdot \left\lfloor \frac{N}{K} \right\rfloor\right).$$

When associated PRB pairs are set according to this method, the PRB pairs including K RE sets forming one D-ECCE can be uniformly distributed at an equal interval in N PRB pairs and thus frequency diversity can be obtained.

Values obtained by performing a modulo operation using $$N'\left(= K \times \left\lfloor \frac{N}{K} \right\rfloor\right)$$

on the calculated indices of associated PRB pair can be determined as final indices of associated PRB pairs such that the indices of the associated PRB pairs are present in the region of N predetermined PRB pairs. Accordingly, a D-ECCE including a t-th RE set belonging to PRB pair #n can be configured in such a manner that the D-ECCE includes a (t+P)-th RE set belonging to PRB pair #

$$\left(\left(p + \left\lfloor \frac{N}{K} \right\rfloor\right) \bmod N'\right)$$

associated with PRB pair #n and a (t+2P)-th RE set belonging to the next associated PRB pair.

If indices are sequentially assigned to all RE sets defined from N PRB pairs, then indices of RE sets occupied by D-ECCE #n are $$n + P \cdot (K-1) \cdot \left\lfloor \frac{n}{P} \right\rfloor,$$

$$n + P \cdot (K-1) \cdot \left\lfloor \frac{n}{P} \right\rfloor + K \cdot P \cdot \left\lfloor \frac{N}{K} \right\rfloor + P,$$

$$n + P \cdot (K-1) \cdot \left\lfloor \frac{n}{P} \right\rfloor + 2K \cdot P \cdot \left\lfloor \frac{N}{K} \right\rfloor + 2P, \ldots,$$

$$n + P \cdot (K-1) \cdot \left\lfloor \frac{n}{P} \right\rfloor + (K-1)K \cdot P \cdot \left\lfloor \frac{N}{K} \right\rfloor + (K-1)P.$$

In other words, when the index of the D-ECCE is #n, RE set #n−P·⌊n/P⌋ (i.e. RE set #

$$n + P \cdot (K-1) \cdot \left\lfloor \frac{n}{P} \right\rfloor$$

in terms of RE set index) in PRB pair #⌊n/P⌋ is set as a reference RE set in the same manner as in the case of L-ECCE. In addition, an operation of selecting an RE set (i.e. RE set to which offset P is additionally applied in terms of RE set index) having an index obtained by adding P to the index of the reference RE set from a PRB pair having an index increased by $$\left\lfloor \frac{N}{K} \right\rfloor$$

(i.e. PRB pair having an index to which an offset of $$K \cdot P \cdot \left\lfloor \frac{N}{K} \right\rfloor$$

is applied in terms of RE set index) is repeated to configure the D-ECCE. To distribute RE set indices in a predetermined region, values, which are obtained by performing a modulo operation using the number of all RE sets on the RE set indices calculated as above, may be set as final RE set indices.

Figure 13:
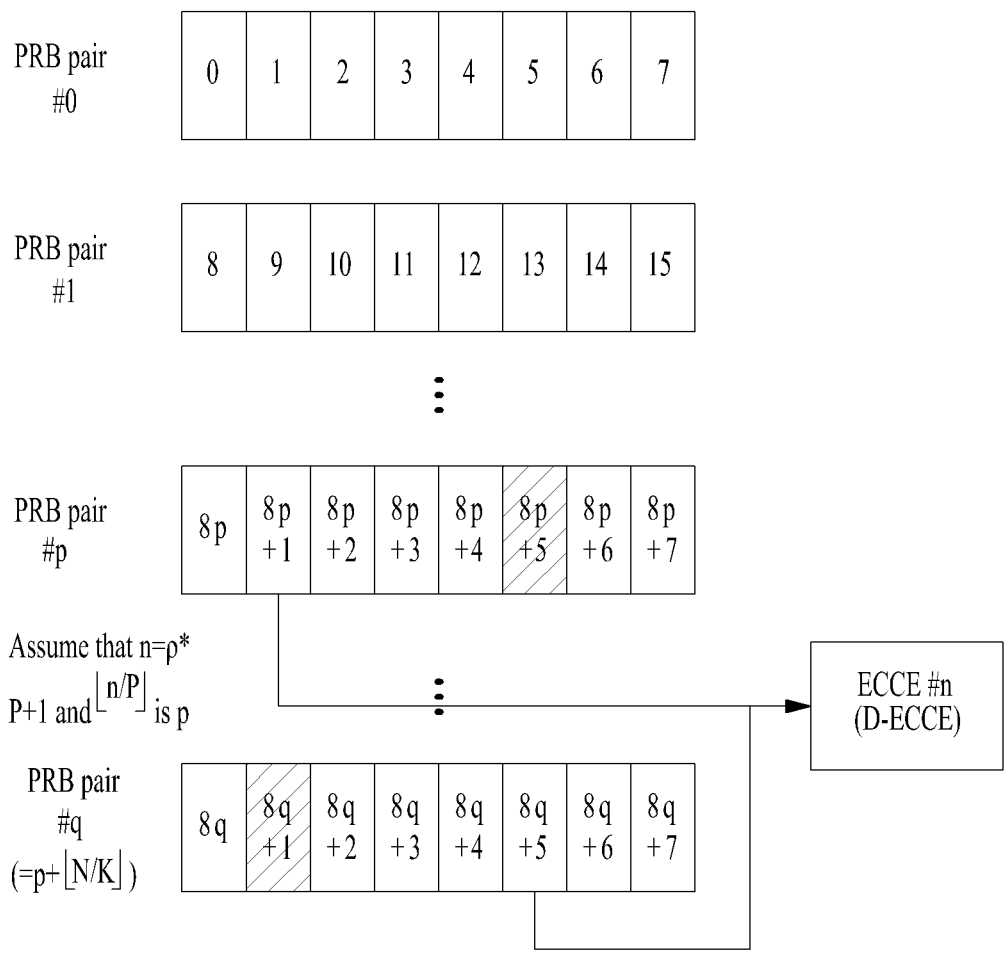
FIG. 13 illustrates an example of defining an ECCE when the ECCE is designated as a D-ECCE according to the first embodiment of the present invention.

FIG. 13 illustrates an example of defining an ECCE when the ECCE is designated as a D-ECCE according to the first embodiment of the present invention. In FIG. 13, it is assumed that the number K of RE sets forming an ECCE is 2 and the number P of ECCEs configured in one PRB pair is 4. That is, it is assumed that the number of RE sets configured in one PRB pair is 8. For simplicity, ⌊n/P⌋ is represented as p.

Referring to FIG. 13, a D-ECCE with an index of #n=p× P+1 is selected from PRB pair #p and RE set #(n+P· (K−1)·⌊n/P⌋=(p×4+1)+4×1×p=8p+1) is selected as a reference RE set. In addition, P=4 is added to the index of the reference RE set in the PRB pair having an index increased by $$\left\lfloor \frac{N}{K} \right\rfloor,$$

that is, PRB pair #

$$p + \left\lfloor \frac{N}{K} \right\rfloor = q$$

and RE set #8q+5 is selected.

In FIG. 13, RE sets represented by dashed lines refer to RE sets used to form an L-ECCE from among RE sets forming ECCE #n. It is possible to easily configure another D-ECCE using these RE sets. Consequently, it is possible to signal only whether an ECCE defined in some PRB pairs (e.g. PRB pairs #

$0 \sim \lfloor \frac{n}{K} \rfloor)$ is a D-ECCE or an L-ECCE and define the attribute of each ECCE on the basis of definition of the D-ECCE and L-ECCE in other PRB pairs without signaling types of all ECCEs.

More specifically, when ECCE #n is an L-ECCE, the L-ECCE is configured using RE sets #8p+1 and #8p+5 belonging to PRB pair #p. In PRB pair #q associated with PRB pair #p, RE sets #8g+1 and #8q+5 corresponding to the RE sets #8p+1 and #8p+5 included in PRB pair #p are not used for a D-ECCE and thus automatically form an L-ECCE. If ECCE #n is a D-ECCE, then another D-ECCE is automatically configured using the RE sets represented by dashed lines in FIG. 13.

That is, upon determining whether a specific ECCE is a localized type or a distributed type, an ECCE associated with the specific ECCE becomes an ECCE of the same type as the specific ECCE. Here, an associated ECCE refers to an ECCE that can use RE sets used when the specific ECCE is a localized type or a distributed type. Accordingly, when types of some ECCEs are determined, types of other ECCEs are automatically determined and thus overhead of signaling whether each ECCE is a localized type or a distributed type can be reduced.

Second Embodiment

A second embodiment of the present invention proposes a method of configuring an ECCE by aggregating consecutive RE sets.

In the second embodiment of the present invention, a PRB pair and PRB pairs associated therewith are determined using the same method as in the first embodiment and only a method of configuring RE sets in each PRB pair is defined.

Considering that one ECCE has K consecutive indices, indices of RE sets occupied by L-ECCE #n can be represented as nK, nK–1, nK+2, . . . , nK+(K–1) That is, K consecutive RE sets starting from RE set nK are selected to configure an L-ECCE.

Figure 14:
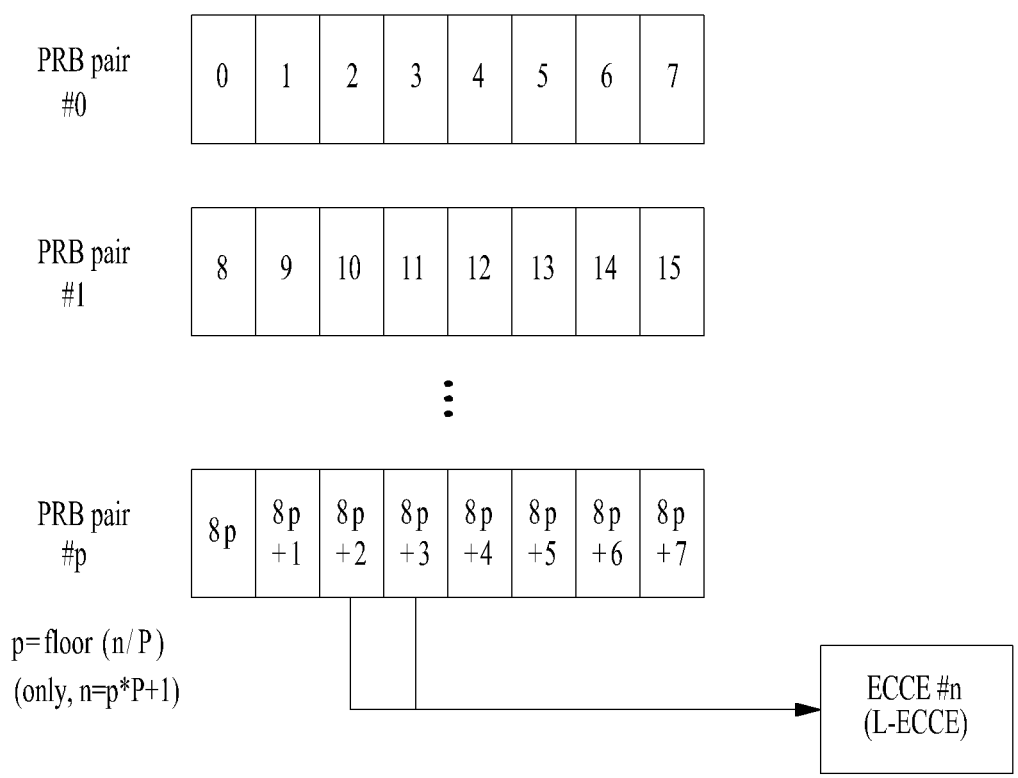
FIG. 14 illustrates an example of configuring an L-ECCE according to a second embodiment of the present invention.

FIG. 14 illustrates an example of configuring an L-ECCE according to the second embodiment of the present invention. In FIG. 14, it is assumed that the number K of RE sets forming one ECCE is 2 and the number P of ECCEs per PRB pair is 4. For simplicity, $\lfloor n/P \rfloor$ is represented as p.

Referring to FIG. 14, L-ECCE #(n=p×P+1) is selected from PRB pair #p, RE set #(nK=2×(p×P+1)=2×(p×4+1)=8p+2) is selected as a reference RE set and RE set #8p+3 subsequent thereto is selected.

Indices of RE sets occupied by D-ECCE #n can be represented as nK, $$nK + K \cdot P \cdot \lfloor \frac{N}{K} \rfloor + 1,$$
$$nK + 2 \cdot K \cdot P \cdot \lfloor \frac{N}{K} \rfloor + 2, \ldots ,$$
$$nK + (K-1) \cdot K \cdot P \cdot \lfloor \frac{N}{K} \rfloor + (K-1).$$

In this case, values obtained by performing a modulo operation using the number of all RE sets on the calculated RE set indices can be used as final RE set indices such that RE set indices are present in a predetermined region.

In other words, RE set #nK is set as a reference RE set and an operation of extracting an RE set with an index obtained by adding 1 to the index nK of the RE set (i.e. applying an offset of 1 to the RE set index) from a PRB pair having an index increased by $$\lfloor \frac{N}{K} \rfloor$$

(i.e. by applying an offset of $$K \cdot P \cdot \lfloor \frac{N}{K} \rfloor$$

to the RE set index) is repeated to configure a D-ECCE.

Figure 15:
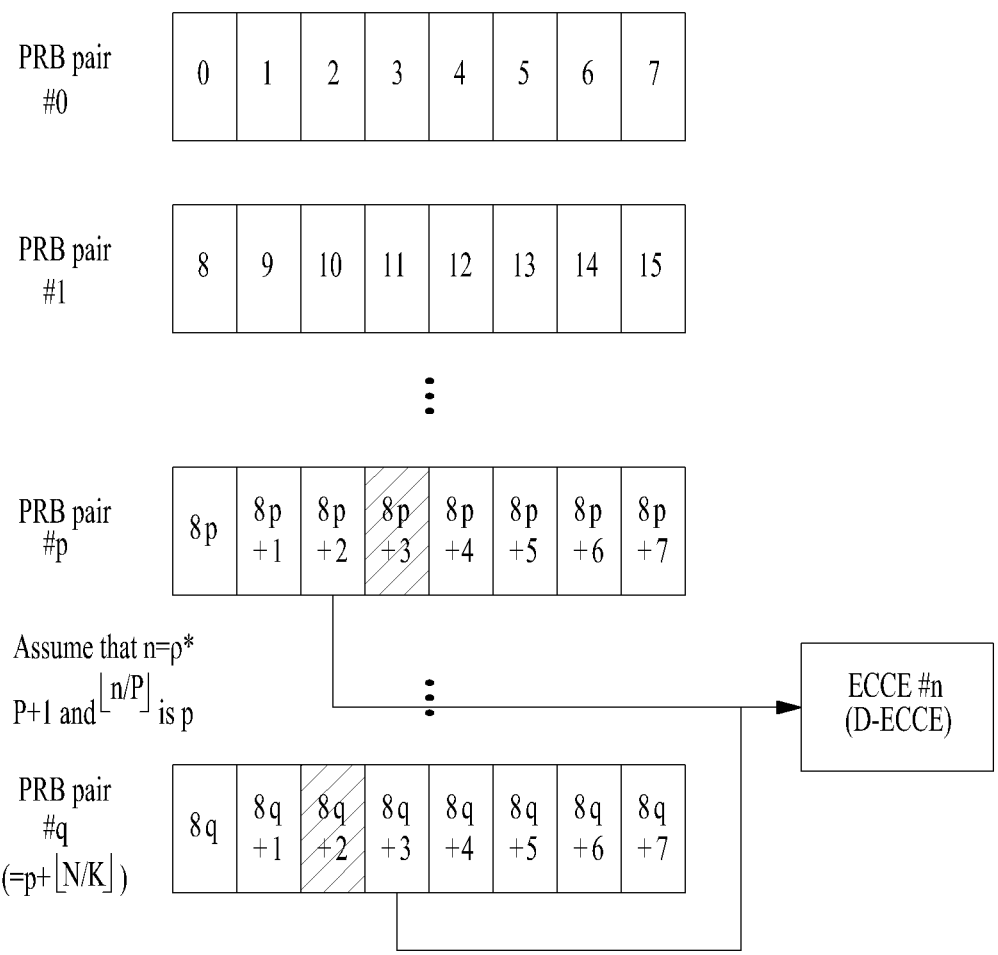
FIG. 15 illustrates an example of configuring a D-ECCE according to the second embodiment of the present invention.

FIG. 15 illustrates an example of configuring a D-ECCE according to the second embodiment of the present invention. In FIG. 15, it is assumed that the number K of RE sets forming one ECCE is 2 and the number P of ECCEs per PRB pair is 4. For simplicity, $\lfloor n/P \rfloor$ is represented as p.

Referring to FIG. 15, D-ECCE #(n=p×P+1) is selected from PRB pair #p, and RE set #(nK=2×(p×P+1)=2×(p×4+1)=8p+2) is selected as a reference RE set. In addition, RE set #8p+3 following RE set #(nK=2×(p×P+1)=2×(p×4+1)=8p+2) is selected from a PRB pair having an index increased by $$\lfloor \frac{N}{K} \rfloor,$$

that is, PRB pair #

$$p + \lfloor \frac{N}{K} \rfloor = q.$$

Third Embodiment

In the aforementioned embodiments, L-ECCEs or D-ECCEs are allocated by sequentially using given PRB pair indices and, particularly, K RE set forming a D-ECCE are selected from PRB pairs spaced at an interval corresponding to a predetermined index. When these indices indicate PRB indices in the frequency domain, it is effective to obtain frequency diversity by separating PRB pair indices by a predetermined spacing.

When frequency resources are allocated to a search space, a search space for an EPDCCH can be designed using resources spaced at a predetermined interval in the frequency domain in order to obtain frequency diversity gain. Here, the search space can be configured by appropriately distributing frequency resources in unit of PRB pair (or RBG) and then sorting the frequency resources.

Figure 16:
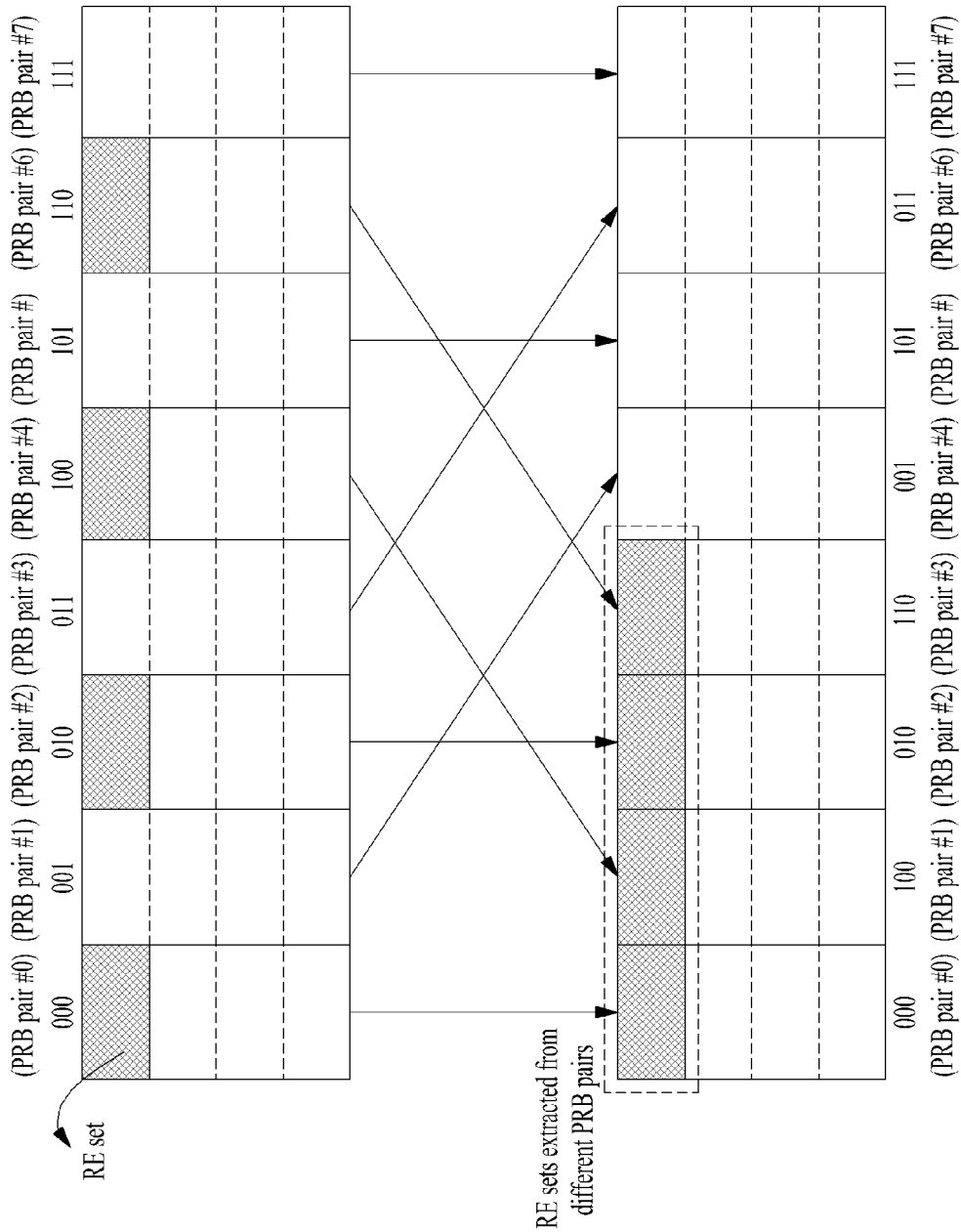
FIG. 16 illustrates an example of applying bit reversal to PRB pair indices according to a third embodiment of the present invention.

FIG. 16 illustrates an example of applying bit reversal to PRB pair indices according to a third embodiment of the present invention. That is, permutation is applied to the PRB pair indices using bit reversal.

Referring to FIG. 16, indices of PRB pairs are appropriately separated in the frequency domain and allocated to a search space through bit reversal instead of being sequentially arranged in the physical domain.

Specifically, when N PRB indices are represented as binary numbers and converted through bit reversal, it can be considered that PRB pairs having neighboring indices are physically sufficiently spaced. In this case, an L-ECCE can be configured by extracting one or more RE sets (EREGs) from one PRB pair as in the first and second embodiments. A D-ECCE can be configured by extracting one or more REGs from PRB pairs having neighboring indices from among PRB indices converted through bit reversal rather than from separated PRB pairs.

Accordingly, indices of RE sets occupied by L-ECCE #n are $n+P\cdot(K-1)\cdot\lfloor n/P\rfloor$, $n+P\cdot(K-1)\cdot\lfloor n/P\rfloor+P$, $n+P\cdot(K-1)\cdot\lfloor n/P\rfloor+2P, \ldots, n+P\cdot(K-1)\cdot\lfloor n/P\rfloor+(K-1)\cdot P$ as in the first embodiment. Otherwise, the indices of the RE sets occupied by L-ECCE #n can be represented as nK, nK+1, nK+2, ..., nK+(K−1) as in the second embodiment.

D-ECCE #n is configured using RE sets with indices of nK, nK+1 and nK+(K−1) in the PRB pair domain. When a modulo operation using N is performed on each index, a corresponding PRB pair index is calculated. In addition, when each index is divided by N and $\lfloor x \rfloor$ operation is performed thereon, indices of RE sets selected from each PRB pair are calculated. Accordingly, the indices of the RE sets can be represented as $$K\cdot P\cdot(nK\bmod N)+\left\lfloor\frac{nK}{N}\right\rfloor,$$

$$K\cdot P\cdot((nK+1)\bmod N)+\left\lfloor\frac{nK+1}{N}\right\rfloor,$$

$$K\cdot P\cdot((nK+2)\bmod N)+\left\lfloor\frac{nK+2}{N}\right\rfloor,\ldots,$$

$$K\cdot P\cdot((nK+(K-1))\bmod N)+\left\lfloor\frac{nK+(K-1)}{N}\right\rfloor.$$

Figure 17:
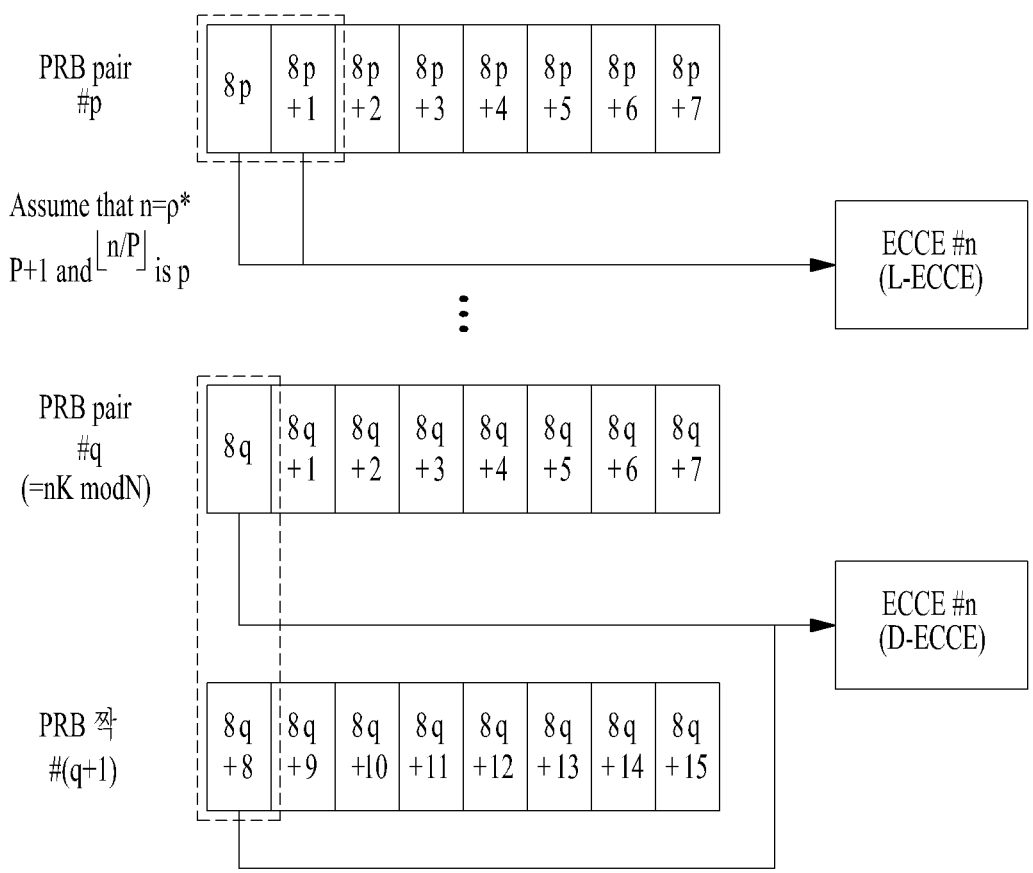
FIG. 17 illustrates an example of configuring an L-ECCE and a D-ECCE according to the third embodiment of the present invention.

FIG. 17 illustrates an example of configuring an L-ECCE and a D-ECCE according to the third embodiment of the present invention. For simplicity, $\lfloor n/P\rfloor$ is represented as p.

Referring to FIG. 17, L-ECCE #(n=p×P+1) is configured by selecting RE sets from PRB pair #p when PRB pair #p has consecutive RE indices. In the case of D-ECCE, however, it can be considered that even PRB pairs having consecutive indices are sufficiently separated according to permutation and thus RE sets from the first RE set are selected from each PRB pair and allocated. Upon allocation of all first RE sets of PRB pairs, a second RE set is selected from the first PRB pair and allocated.

Specifically, D-ECCE #(n=p×P+1) can be configured by selecting the first RE set #8q from PRB pair #(q=nK mod N) and then selecting the first RE set #8q+8 from PRB pair #q+1.

Another method of applying permutation to PRB pairs and then configuring an ECCE using consecutive PRB pairs may be considered. PRB pairs #p, #p+1, ..., #p+K−1 are grouped on the basis of PRB pair #p that satisfies p=K*t (t=0, 1, 2, ...) and a total of K*P ECCE types formed in this group are designated.

Accordingly, when ECCE #n(t·K·P≤n<(t+1)·K·P) is an L-ECCE and r=n−p×P, D-ECCE #n can be configured using RE sets with indices of $$K\cdot P\cdot p+\left\lfloor\frac{r}{P}\right\rfloor\cdot K\cdot P+(r\bmod P),$$

-continued $$K\cdot P\cdot p+\left\lfloor\frac{r}{P}\right\rfloor\cdot K\cdot P+(r\bmod P)+P,$$

$$K\cdot P\cdot p+\left\lfloor\frac{r}{P}\right\rfloor\cdot K\cdot P+(r\bmod P)+2P,\ldots,$$

$$K\cdot P\cdot p+\left\lfloor\frac{r}{P}\right\rfloor\cdot L\cdot P+(r\bmod P)+(K-1)P.$$

In addition, RE set indices may be selected by applying circular shift thereto such that the RE set indices have values in the range of K·P·p to K·P·(p+K)−1.

Figure 18:
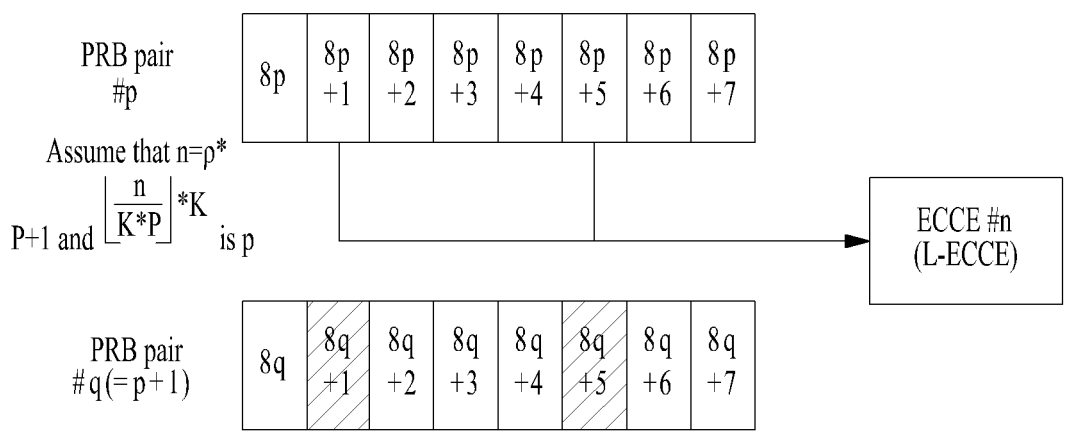
FIG. 18 illustrates another example of configuring an L-ECCE according to the third embodiment of the present invention.

FIG. 18 illustrates another example of configuring an L-ECCE according to the third embodiment of the present invention. For simplicity, $$\left\lfloor\frac{n}{K\times P}\right\rfloor\times K$$

is represented as p. In FIG. 18, it is assumed that K is 2 and P is 4.

Referring to FIG. 18, L-ECCE #(n=p×P+1) is configured in PRB pair #p and #8p+1 and #8p+5 are selected as indices of corresponding RE sets.

Figure 19:
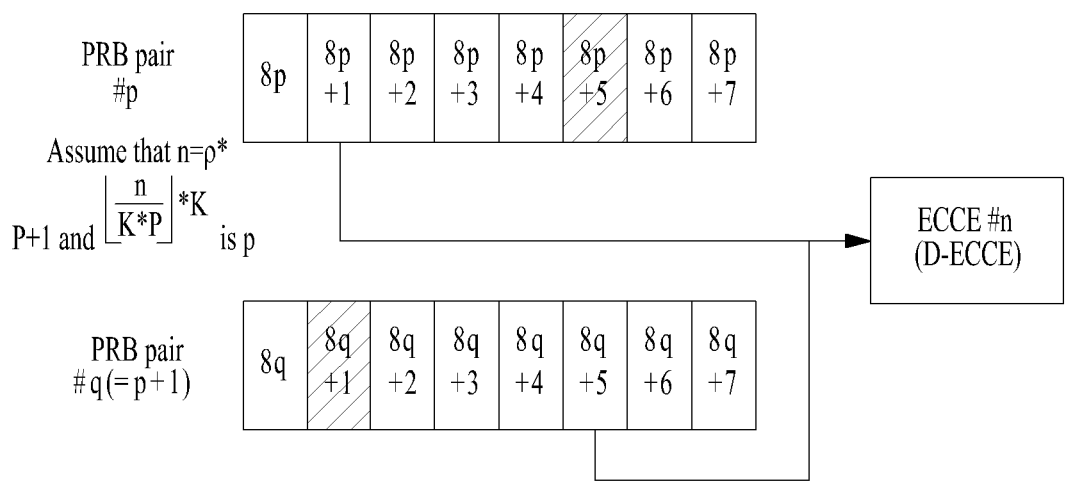
FIG. 19 illustrates an example of configuring a D-ECCE according to the third embodiment of the present invention.

FIG. 19 illustrates another example of configuring a D-ECCE according to the third embodiment of the present invention. For simplicity, $$\left\lfloor\frac{n}{K\times P}\right\rfloor\times K$$

is represented as p and it is assumed that K is 2 and P is 4.

Referring to FIG. 19, when ECCE #(n=p×P+1) (t·K·P≤n<(t+1)·K·P) is a D-ECCE and r=n−p×P, D-ECCE #n is configured using RE sets with indices of $$K\cdot P\cdot p+\left\lfloor\frac{r}{P}\right\rfloor\cdot K\cdot P+(r\bmod P),$$

$$K\cdot P\cdot p+\left\lfloor\frac{r}{P}\right\rfloor\cdot K\cdot P+(r\bmod P)+P+K\cdot P,$$

$$K\cdot P\cdot p+\left\lfloor\frac{r}{P}\right\rfloor\cdot K\cdot P+(r\bmod P)+2P+2K\cdot P,\ldots,$$

$$K\cdot P\cdot p+\left\lfloor\frac{r}{P}\right\rfloor\cdot K\cdot P+(r\bmod P)+(K-1)P+(K-1)\cdot K\cdot P.$$

RE set indices may be selected by applying circular shift thereto such that the RE set indices have values in the range of K·P·p to K·P·(p+K)−1.

Upon determination of the ECCE type in PRB pair #p, the ECCE type in PRB pairs #p+1, ..., #p+K−1, which are associated with PRB pair #p and used to form a D-ECCE, is determined. That is, the type of all ECCEs in a group is automatically determined by deciding the type of a specific ECCE. As shown in FIG. 18, when ECCE #n is configured as an L-ECCE using RE sets #8p+1 and #8p+5, ECCE #n+4 is automatically formed as an L-ECCE using RE sets #8q+1 and #8q+5 which will be used when RE sets #8p+1 and #8p+5 form a D-ECCE.

When ECCE # n is configured as a D-ECCE using RE sets #8p+1 and #8p+5, as shown in FIG. 19, ECCE #n+4 is automatically configured as a D-ECCE using RE sets #8q+1 과 #8q+5 which will be used when RE sets #8p+1 and #8p+5 form an L-ECCE.

Fourth Embodiment

A fourth embodiment of the present invention proposes another method of configuring an ECCE by aggregating consecutive RE sets. In the fourth embodiment of the present invention, a PRB pair and PRB pairs associated therewith are determined using the same method as in the first embodiment and only a method of configuring RE sets in each PRB pair is defined.

Figure 20:
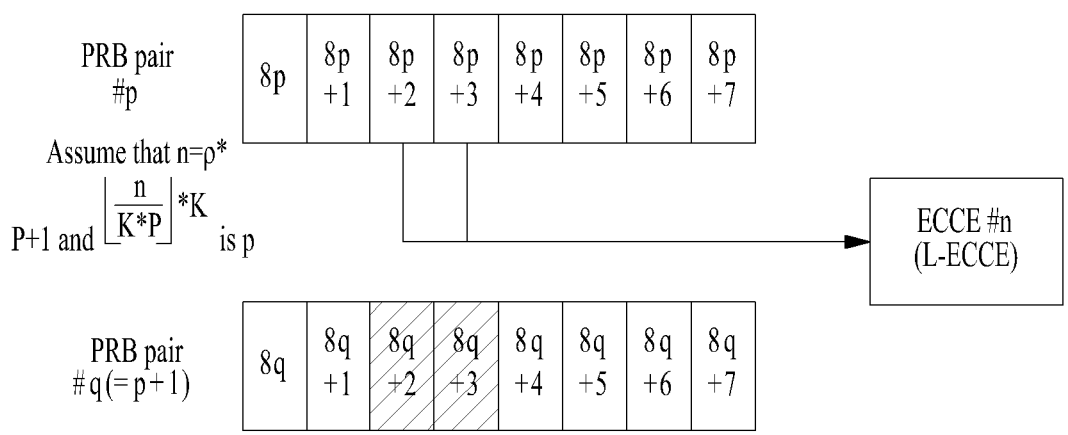
FIG. 20 illustrates an example of configuring an L-ECCE according to a fourth embodiment of the present invention.

FIG. 20 illustrates an example of configuring an L-ECCE according to the fourth embodiment of the present invention. For simplicity, $$\left\lfloor \frac{n}{K \times P} \right\rfloor \times K$$

is represented as p and it is assumed that K is 2 and P is 4.

Referring to FIG. 20, while RE sets forming an ECCE are spaced at an interval of P in consideration of the RE set group spacing in the first embodiment, one ECCE has K consecutive indices in the fourth embodiment. Accordingly, indices of RE sets forming one ECCE #n can be represented as nK, nK+1, nK+2, ..., nK+(K−1). Here, actually used RE set indices may be selected by applying circular shift to RE set indices such that the RE set indices have values in the range of K×P×p to K·P·(p+K)−1.

Figure 21:
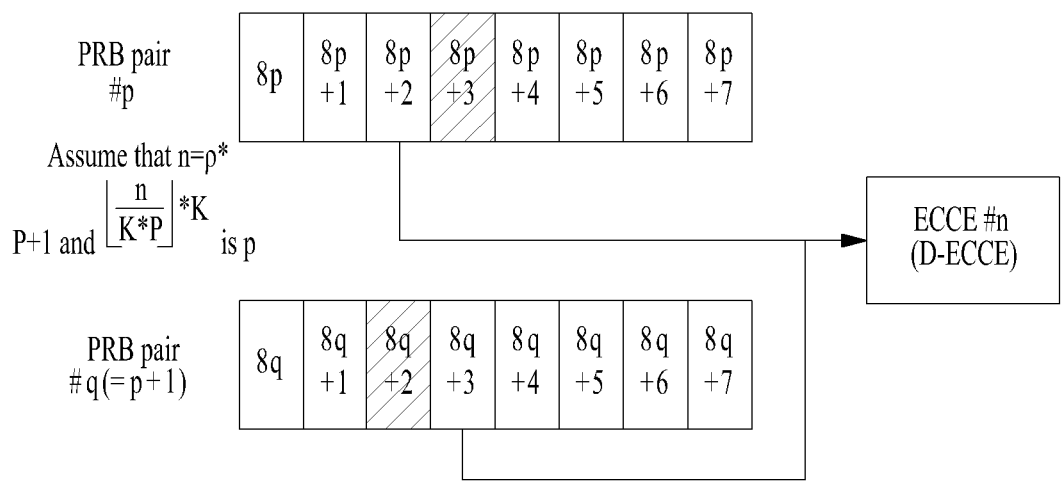
FIG. 21 illustrates an example of configuring a D-ECCE according to the fourth embodiment of the present invention.

FIG. 21 illustrates an example of configuring a D-ECCE according to the fourth embodiment of the present invention.

$$\left\lfloor \frac{n}{K \times P} \right\rfloor \times K$$

is represented as p for simplicity and it is assumed that K is 2 and P is 4.

Referring to FIG. 21, when ECCE #n is a D-ECCE, D-ECCE #n can be configured using RE sets with indices of nK, nK+1+K·P, nK+2+2K·P, ..., nK+2+(K−1)K·P on the basis of index nK in the same manner as in configuration of an L-ECCE. Here, actually used RE set indices may be selected by applying circular shift to RE set indices such that the RE set indices have values in the range of K×P×p to K·P·(p+K)−1.

FIG. 19 with respect to the third embodiment and FIG. 21 with respect to the fourth embodiment illustrate an example of permuting PRB pairs and selecting one RE set (i.e. EREG) per PRB pair, as shown in FIG. 16, and configuring a D-ECCE using K PRB pairs adjacent thereto. When one D-ECCE is configured using K EREGs, it is possible to use not only the method of extracting RE sets from K PRBs, as described above, but also a method of configuring a D-ECCE using less than K PRB pairs. For example, a D-ECCE can be configured using $$\left\lfloor \frac{K}{2} \right\rfloor$$

PRB pairs.

Specifically, when $$K' = \left\lfloor \frac{K}{2} \right\rfloor,$$

PRB pairs #p, #p+1, ..., #p+K'−1 are grouped on the basis of PRB pair #p that satisfies p=K'×t (t=0, 1, 2 ...) and a total of K'×P ECCE types formed in this group are designated. When ECCE #n (t·K'·P≤n<(t+1)·K'·P) is a D-ECCE and r=n−p×P, indices of RE sets forming the D-ECCE are $$K \cdot P \cdot p + \left\lfloor \frac{r}{P} \right\rfloor \cdot K \cdot P + (r \bmod P),$$

$$K \cdot P \cdot p + \left\lfloor \frac{r}{P} \right\rfloor \cdot K \cdot P + (r \bmod P) + P + K \cdot P,$$

$$K \cdot P \cdot p + \left\lfloor \frac{r}{P} \right\rfloor \cdot K \cdot P + (r \bmod P) + 2P + 2K \cdot P, \ldots,$$

$$K \cdot P \cdot p + \left\lfloor \frac{r}{P} \right\rfloor \cdot K \cdot P + (r \bmod P) + (K-1)P + (K-1) \cdot K \cdot P.$$

That is, the D-ECCE is configured in the same manner as in the case in which one D-ECCE is configured using K RE sets (i.e. EREGs) except that the value of the index p of the reference PRB pair is changed.

Here, the RE set indices may be selected by applying circular shift to RE set indices such that the RE set indices have values in the range of K×P×p to K×P×(p+K')−1, distinguished from the case in which one D-ECCE is configured using K RE sets (i.e. EREGs).

Figure 22:
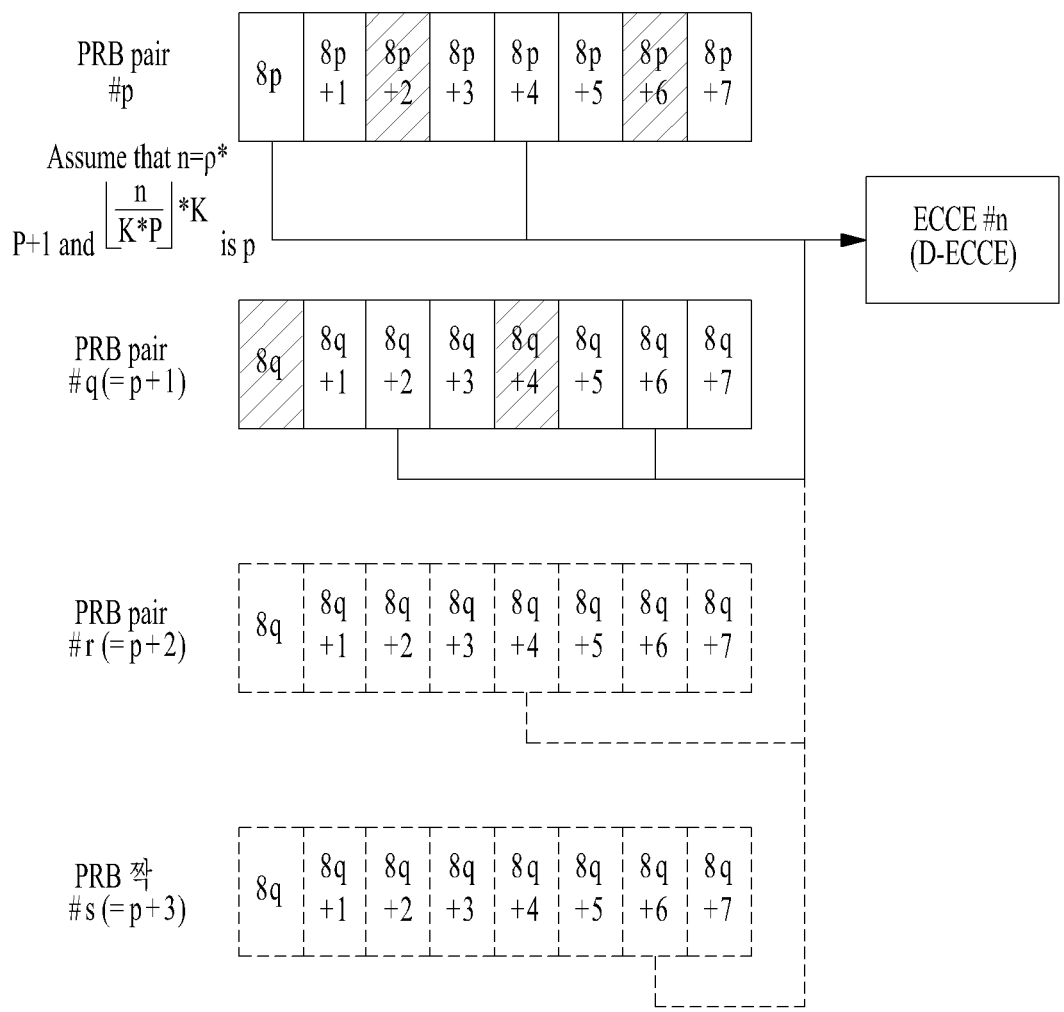
FIG. 22 illustrates another example of configuring a D-ECCE according to the fourth embodiment of the present invention.

FIG. 22 illustrates another example of configuring a D-ECCE according to the fourth embodiment of the present invention. Particularly, FIG. 22 shows a method of selecting RE sets which form a D-ECCE configured using K REGs from $$K' = \left\lfloor \frac{K}{2} \right\rfloor$$

PRB pairs.

REGs, that is, RE sets forming one D-ECCE may be extracted from $$\left\lfloor \frac{K}{4} \right\rfloor$$

PRB pairs instead of $$K' = \left\lfloor \frac{K}{2} \right\rfloor$$

PRB pairs. Accordingly, when only the index of the reference PRB pair is set to p=K"×t (t=0, 1, 2 ...) even in the case of $$K'' = \left\lfloor \frac{K}{4} \right\rfloor$$

PRB pairs, the indices of RE sets forming one D-ECCE can be obtained in the same manner. In this case, actually used RE set indices may be selected by applying circular shift to RE set indices such that the RE set indices have values in the range of K×P×p to K×P×(p+K")−1. That is, even when the size of a PRB pair group is set to a value less than K, only the index p of the reference PRB pair and the range of indices of actually used RE sets are adjusted according to the size of the PRB pair group and determined RE set indices, determined according to the aforementioned method, are circularly shifted and applied.

As described above, each UE can be signaled such that the number of PRBs in a PRB pair group can be set to K, $$\left\lfloor \frac{K}{2} \right\rfloor$$

or other values and indices of RE sets forming a D-ECCE can be automatically determined using the aforementioned methods upon determination of the number of PRB pairs in the PRB pair group.

Fifth Embodiment

While ECCEs configured according to the above-described embodiments are indexed in such a manner that the ECCE index increases by 1 in a PRB pair in the case of L-ECCE and then ECCEs in the next PRB pair are assigned indices, the ECCEs may be re-indexed in order to set an EPDCCH search space. For example, ECCEs can be re-indexed in such a manner that indices are assigned to CCEs belonging to a neighboring PRB pair while increasing the indices by 1 in the case of L-ECCE.

FIG. 23 illustrates an example of re-indexing ECCEs according to a fifth embodiment of the present invention. Particularly, FIG. 23 shows an example of re-indexing indices of ECCEs, which have been assigned in an increasing manner in PRB pairs, in such a manner that the indices increase while moving to neighboring PRB pairs when 4 ECCEs are configured per PRB pair and thus a total of 32 ECCEs are formed in a total of 8 PRB pairs.

Figure 24:
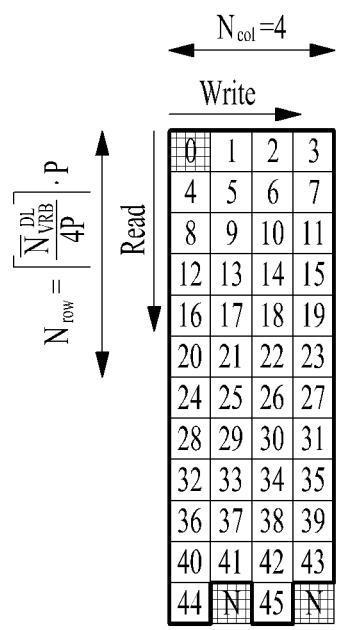
FIG. 24 illustrates another example of re-indexing ECCEs according to the fifth embodiment of the present invention.

FIG. 24 illustrates another example of re-indexing ECCEs according to the fifth embodiment of the present invention. Particularly, FIG. 24 shows an example of re-assigning indices by writing the indices in column order and then reading the indices in row order using block interleaving. FIG. 24 illustrates a block interleaving scheme when the number of columns is 4.

A description will be given of selection of RE sets forming each ECCE when the ECCE re-indexing scheme shown in FIG. 23 is applied.

When ECCE indices are re-indexed, a conversion formula for deriving indices before being re-indexed using the re-indexed ECCE indices as inputs is required in order to apply the expression for deriving RE sets in the aforementioned embodiments. If one ECCE is composed of K RE sets and one PRB pair is composed of P ECCEs, then one PRB pair is divided into K×P RE sets. In this case, a total of N×K×P RE sets is defined using N PRB pairs and N×P ECCEs can be defined using the N×K×P RE sets.

In this case, when an ECCE index before being re-indexed is n and a re-indexed ECCE index is n', n can be defined by Equation 1.

$$n = (n' \bmod N) \cdot P + \left\lfloor \frac{n'}{N} \right\rfloor \qquad \text{[Expression 1]}$$

Accordingly, when ECCE #n' is designated as a D-ECCE, an RE set index can be calculated by computing the ECCE index n before being re-indexed using Expression 1 and applying n to the aforementioned RE set index configuration expression.

For example, when ECCE #n is designated as a D-ECCE, the following expression 2 can be used in order to uniformly distribute indices of RE sets forming ECCE #n in PRB pairs. Expression 2 conforms to the method of defining a D-ECCE according to the first embodiment of the present invention.

$$n + P \cdot (K-1) \cdot \left\lfloor \frac{n}{P} \right\rfloor \qquad \text{[Expression 2]}$$

$$n + P \cdot (K-1) \cdot \left\lfloor \frac{n}{P} \right\rfloor + K \cdot P \cdot \left\lfloor \frac{N}{K} \right\rfloor + P$$

$$n + P \cdot (K-1) \cdot \left\lfloor \frac{n}{P} \right\rfloor + 2K \cdot P \cdot \left\lfloor \frac{N}{K} \right\rfloor + 2P, \ldots,$$

$$n + P \cdot (K-1) \cdot \left\lfloor \frac{n}{P} \right\rfloor + (K-1)K \cdot P \cdot \left\lfloor \frac{N}{K} \right\rfloor + (K-1)P$$

When Expression 1 in which n is represented by re-indexed ECCE index n' is substituted for Expression 2, $$\left\lfloor \frac{n}{P} \right\rfloor = \left\lfloor (n' \bmod N) + \left\lfloor \frac{(n'/N)}{P} \right\rfloor \right\rfloor = n' \bmod N$$

is obtained. Here, since n'<N·P and thus $$\left\lfloor \frac{(n'/N)}{P} \right\rfloor < 1$$

and $\lfloor (n' \bmod N) \rfloor$ is n' mod N because n' mod N is an integer, the above equation can be established. Accordingly, indices of RE sets forming D-ECCE #n' after re-indexing are represented by Expression 3.

$$P \cdot K \cdot (n' \bmod N) + \left\lfloor \frac{n'}{N} \right\rfloor \qquad \text{[Expression 3]}$$

$$P \cdot K \cdot (n' \bmod N) + \left\lfloor \frac{n'}{N} \right\rfloor + K \cdot P \cdot \left\lfloor \frac{N}{K} \right\rfloor + P$$

$$P \cdot K \cdot (n' \bmod N) + \left\lfloor \frac{n'}{N} \right\rfloor + 2K \cdot P \cdot \left\lfloor \frac{N}{K} \right\rfloor + 2P, \ldots,$$

$$P \cdot K \cdot (n' \bmod N) + \left\lfloor \frac{n'}{N} \right\rfloor + (K-1) \cdot K \cdot P \cdot \left\lfloor \frac{N}{K} \right\rfloor + (K-1) \cdot P$$

Referring to Expression 3, RE set #

$$\left\lfloor \frac{n'}{N} \right\rfloor$$

(i.e. RE set with an index of $$P \cdot K \cdot (n' \bmod N) + \left\lfloor \frac{n'}{N} \right\rfloor$$

in terms of RE set index), which corresponds to a quotient obtained when D-ECCE index n' is divided by the number N of PRB pairs, in a (n' mod N)-th PRB pair corresponding to a remainder obtained when D-ECCE index n' is divided by the number N of PRB pairs is set as a reference RE set forming the corresponding D-ECCE. One RE set is extracted from a PRB pair spaced from the reference RE set by $$\left\lfloor \frac{N}{K} \right\rfloor$$

(i.e. a position separated from the reference RE set by $$K \cdot P \cdot \left\lfloor \frac{N}{K} \right\rfloor$$

in terms of RE set index) such that the corresponding RE set has an index having an offset of P from the reference RE set in the PRB pair. That is, the corresponding RE set has a final index spaced from the reference RE set by $$K \cdot P \cdot \left\lfloor \frac{N}{K} \right\rfloor + P$$

in terms of RE set index. The D-CCE is configured by repeating this operation until K RE sets including the reference RE set appear. A modulo operation using the total number of RE sets may be performed on RE set indices represented by the expression such that the RE set indices are determined only within a predetermined range.

In Expression 3, indices of neighboring RE sets are set such that the indices increase by $$K \cdot P \cdot \left\lfloor \frac{N}{K} \right\rfloor$$

in order to distribute the RE sets forming the D-ECCE at a predetermined PRB pair spacing in a reference PRB pair and associated PRB pairs. Here, when the number N of allocated PRB pairs is sufficiently greater than the number K of RE sets per ECCE and thus a spacing between associated PRB pairs is 1 or more, the aforementioned scheme can be applied. However, when the number N of allocated PRB pairs is less than the number K of RE sets per ECCE, the PRB pair spacing needs to be adjusted such that neighboring RE sets are not allocated to the same PRB pair.

When $$\left\lfloor \frac{N}{K} \right\rfloor$$

which represents the PRB pair index spacing in Expression 3 is replaced by $$\max\left(1, \left\lfloor \frac{N}{K} \right\rfloor\right),$$

neighboring RE sets can be allocated having at least one PRB pair spacing even when K is greater than N. Here, indices of RE sets forming the D-ECCE can be represented by Expression 4.

$$n + P \cdot (k-1) + \left\lfloor \frac{n}{P} \right\rfloor \qquad \text{[Expression 4]}$$

-continued
$$n + P \cdot (K-1) + \left\lfloor \frac{n}{P} \right\rfloor + K \cdot P \cdot \max\left(1, \left\lfloor \frac{N}{K} \right\rfloor\right) + P$$

$$n + P \cdot (K-1) + \left\lfloor \frac{n}{P} \right\rfloor + 2K \cdot P \cdot \max\left(1, \left\lfloor \frac{N}{K} \right\rfloor\right) + 2P, \ldots$$

$$n + P \cdot (K-1) + \left\lfloor \frac{n}{P} \right\rfloor +$$

$$(K-1)K \cdot P \cdot \max\left(1, \left\lfloor \frac{N}{K} \right\rfloor\right) + (K-1)P$$

The indices of the RE sets forming the D-ECCE are represented as re-indexed ECCE index re according to Expression 5.

$$P \cdot K \cdot (n' \bmod N) + \left\lfloor \frac{n'}{N} \right\rfloor \qquad \text{[Expression 5]}$$

$$P \cdot K \cdot (n' \bmod N) + \left\lfloor \frac{n'}{N} \right\rfloor + K \cdot P \cdot \max\left(1, \left\lfloor \frac{N}{K} \right\rfloor\right) + P$$

$$P \cdot K \cdot (n' \bmod N) + \left\lfloor \frac{n'}{N} \right\rfloor + 2K \cdot P \cdot \max\left(1, \left\lfloor \frac{N}{K} \right\rfloor\right) + 2P, \ldots$$

$$P \cdot K \cdot (n' \bmod N) + \left\lfloor \frac{n'}{N} \right\rfloor +$$

$$(K-1)K \cdot P \cdot \max\left(1, \left\lfloor \frac{N}{K} \right\rfloor\right) + (K-1)P$$

Referring to Expression 5, since K·P RE sets are present in one PRB pair, $$(n' \bmod N) + k \cdot \max\left(1, \left\lfloor \frac{N}{K} \right\rfloor\right)$$

(k=0, 1, . . . , K−1) corresponds to PRB pair indices. When a modular operation using the number of all RE sets is performed on RE set indices such that the RE set indices are determined only in a specific range, the RE set indices can be represented as $$\left(n' + k \cdot \max\left(1, \left\lfloor \frac{N}{K} \right\rfloor\right)\right) \bmod N.$$

Furthermore, the position of the index of an EREG, that is, an RE set in a PRB pair corresponds to $$\left\lfloor \frac{n'}{N} \right\rfloor + k \cdot P.$$

Accordingly, generalized indices of EREGs forming ECCE #n are represented by Expression 6. In Expression 6, $N_{RB}^{Sm}$ indicates the number N of PRB pairs and $N_{RB}^{ECCE}$ indicates the number P of ECCEs per PRB pair. In addition, $N_{ECCE}^{EREG}$ denotes the number K of RE sets per ECCE.

$\lfloor n/N_{RB}^{Sm} \rfloor + j N_{RB}^{ECCE}$ in PRB index #(n+jmax(1, $N_{RB}^{Sm}/N_{ECCE}^{EREG}$))mod $N_{RB}^{Sm}$ [Expression 6]

In Expression 6, j denotes indices of EREGs forming one ECCE and are represented by 0, 1, . . . , $N_{ECCE}^{EREG}-1$.

Similarly, RE sets forming L-ECCE #n can be generalized as represented by Expression 7. In Expression 7, $N_{RB}^{ECCE}$ indicates the number P of ECCEs per PRB pair. Expression 7 also conforms to the method for defining an L-ECCE according to the first embodiment.

$$(n \bmod N_{RB}^{ECCE}) + jN_{RB}^{ECCE} \text{ in PRB index } \#\lfloor n/N_{RB}^{ECCE} \rfloor \quad \text{[Equation 7]}$$

Sixth Embodiment

Since a D-ECCE is formed by grouping RE sets present in a plurality of PRB pairs in the aforementioned embodiments, different DM RS antenna ports for respective RE sets may be used to detect one D-ECCE.

This causes a complicated operation using multiple antenna ports for detection of one D-ECCE. To prevent this, multiple RE sets forming a D-ECCE may be restricted such that the RE sets use one antenna port. For example, when a specific D-ECCE is detected, an antenna port allocated to an RE set representative of the D-ECCE can be used to detect the remaining RE sets.

The representative RE set may be an RE set having a minimum or maximum RE set index. Otherwise, a starting RE set that configures a corresponding D-ECCE or a reference RE set, such as RE set #

$$n + P(K-1)\left\lfloor \frac{n}{P} \right\rfloor$$

in FIG. 13 or RE set #nK in FIG. 15, may be set as the representative RE set.

Figure 25:
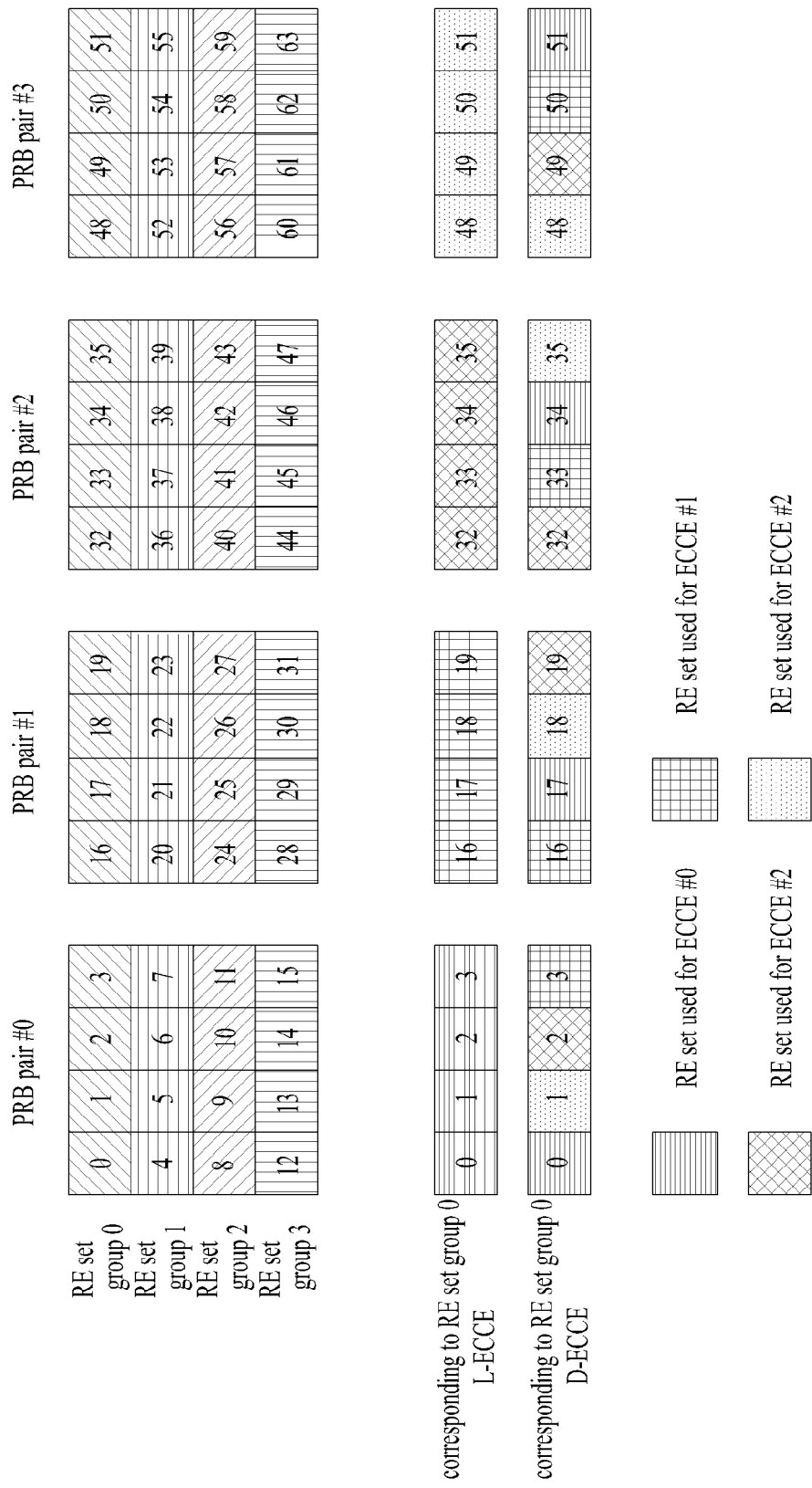
FIG. 25 illustrates an example of configuring an L-ECCE and a D-ECCE according to a sixth embodiment of the present invention.

FIG. 25 illustrates an example of configuring an L-ECCE and a D-ECCE according to a sixth embodiment of the present invention. In FIG. 15, it is assumed that 4 PRB pairs are used, each PRB pair is divided into 16 RE sets and one ECCE is composed of 4 RE sets.

In addition, it is assumed that 4 RE sets having consecutive indices and present in the same PRB pair form each ECCE in the case of L-ECCE, as illustrated in FIG. 14, and 4 RE sets consecutively located in spaced PRB pairs form each ECCE in the case of D-ECCE, as shown in FIG. 15. Furthermore, it is assumed that ECCE index increases in a direction in which PRB pair index increases in the case of L-ECCE, as illustrated hi FIG. 22.

Referring to FIG. 25, all RE sets may be divided into a plurality of groups. In FIG. 25, it is assumed that all RE sets are divided into 4 groups. That is, RE sets {0, 1, 2, 3, 16, 17, 18, 19, 32, 33, 34, 35, 48, 49, 50, 51} are grouped into group #0 and a total of 4 RE set groups are formed in a similar manner.

As described above, upon determining whether one RE set group is used to form an L-ECCE or a D-ECCE, it can be confirmed that the type of the ECCE using the RE sets belonging to the corresponding group is automatically set. For example, when an L-ECCE is defined using resources of RE set group #0, a D-ECCE cannot be defined using RE sets belonging to RE set group #0 and ECCEs using the same RE set group #0, that is, ECCEs #1, #2 and #3 automatically become the L-ECCE. This means that types of L-ECCE and D-ECCE are determined per RE set group.

In other words, when a set of ECCE indices is defined according to correlation between RE sets constituting the L-ECCE and D-ECCE, a set of resources occupied by the ECCE index set is fixed irrespective of the type of ECCEs corresponding to the ECCE index set. For example, when the ECCE index set is {ECCE #0, ECCE #1, ECCE #2, ECCE #3}, 4 ECCEs corresponding to the ECCE index set are defined using only RE set group #0 all the time irrespective of whether the 4 ECCEs are localized type or distributed type. This means that determination of ECCE type of a specific RE set group does not affect ECCE types of other RE set groups, and thus D-ECCE and L-ECCE can be unrestrictedly multiplexed on an RE set type basis.

FIG. 26 illustrates an example of determining a starting position for an EPDCCH candidate in a search space after determining methods for multiplexing an L-ECCE and a D-ECCE according to the sixth embodiment of the present invention.

FIG. 26(a) assumes that an EPDCCH search space is composed of 16 ECCEs and an L-ECCE type EPDCCH is allocated. When up to 4 blinding decoding operations can be performed per aggregation level, 4 ECCE candidates that can be used as the starting position needs to be determined. When ECCEs of aggregation level 1 are decoded, the following rule can be applied in order to determine the starting position.

It is not desirable that a large number of ECCE candidates available as the starting position be present in a specific RE set group. This is because, when it is confirmed that some of ECCEs or RE sets constituting one RE set group correspond to a D-ECCE while ECCE candidates for the EPDCCH starting position are concentrated on the RE set group, as shown in FIG. 26(b), any L-ECCE cannot be multiplexed in the remaining part of the RE set group.

Furthermore, it is not desirable that a large number of ECCE candidates available as the starting position be present in a specific PRB pair. When ECCE candidates for the starting position are present only in a specific PRB pair from among PRB pairs designated as a search space, as shown in FIG. 26(c), a scheduling scheme for solving or utilizing a frequency selective property of a channel cannot be used. For example, when all ECCE candidates for the EPDCCH starting position are present in one PRB pair, an eNB has to schedule corresponding RBs irrespective of channel state of the RBs.

Accordingly, it is desirable that ECCE candidates for the EPDCCH blind decoding starting position be uniformly distributed in the PRB pair domain and ECCE domain, as shown in FIG. 26(d), considering the aforementioned two characteristics.

When an ECCE index at which blind decoding starts is k, blind decoding order is n and a gap between blind decoding operations is g, the scheme shown in FIG. 26(b) corresponds to g=1 and thus index s(n) corresponding to the starting position of each blind decoding equals k+n. Since the scheme shown in FIG. 26(c) corresponds to g=4, index s(n) corresponding to the starting position of each blind decoding equals k+4n. The scheme shown in FIG. 26(d), which includes the characteristics of both the schemes of FIGS. 26(b) and 26(c), corresponds to g=5 and one RE set group has only one starting position, and thus s(n) can be represented as $N_{cp}*n+(k+5n) \bmod N_{cp}$. Here, $N_{cp}$ is the number of ECCEs per PRB pair and k in this expression does not exceed $N_{cp}-1$.

Figure 27:
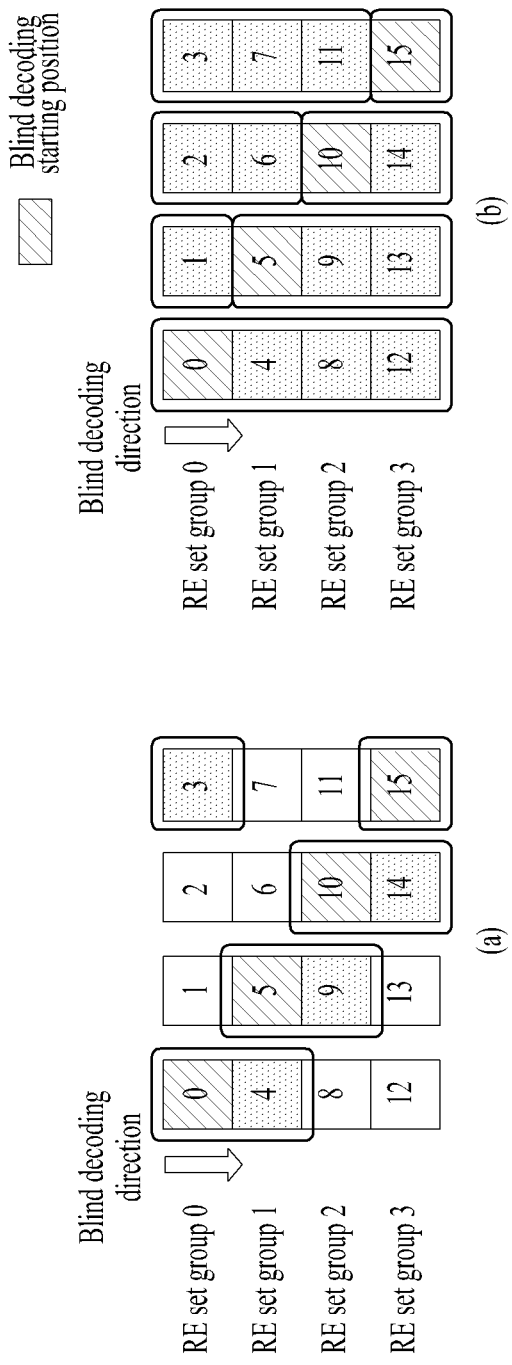
FIG. 27 illustrates another example of determining a starting position for EPDCCH candidates in a search space according to the sixth embodiment of the present invention.

FIG. 27 illustrates another example of determining a starting position for an EPDCCH candidate in a search space according to the sixth embodiment of the present invention.

When the scheme illustrated in FIG. 26(d) is applied to aggregation level 2 or 4, a blind decoding starting position can be defined and blind decoding can be performed through ECCEs corresponding to the aggregation level, as illustrated in FIG. 27.

The method for determining a blind decoding starting position according to the sixth embodiment of the present invention can be applied to the D-ECCE as well as the L-ECCE. In the sixth embodiment, RE set groups need to be considered for a logical ECCE domain rather than the PRB set domain.

Figure 28:
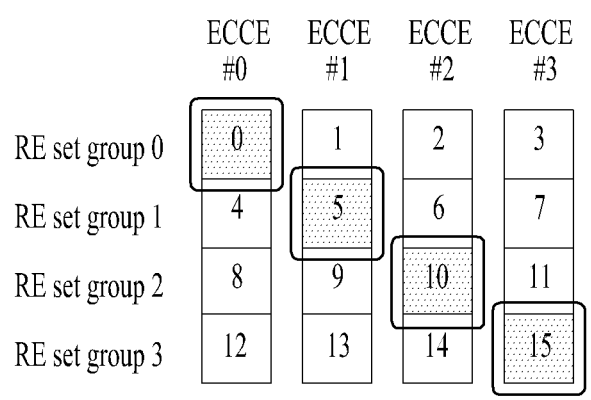
FIG. 28 illustrates another example of determining a starting position for EPDCCH candidates in a search space according to the sixth embodiment of the present invention.

FIG. 28 illustrates another example of determining a starting position for an EPDCCH candidate in a search space according to the sixth embodiment of the present invention. In the case of FIG. 28, a blind decoding starting position for an EPDCCH search space can be determined at aggregation level 1.

Seventh Embodiment

A seventh embodiment of the present invention proposes a method for efficiently multiplexing a localized EPDCCH and a distributed EPDCCH in one PRB pair. For this multiplexing method, the following EPDCCH search space characteristics may be required.

1) An RE set, that is, an EREG needs to be a common resource allocation unit in both the localized EPDCCH and distributed EPDCCH.

2) While one or more PRB sets for an EPDCCH can be given, only one EPDCCH type should be valid in each PRB set for the EPDCCH from the viewpoint of a UE. That is, multiplexing of the localized EPDCCH and distributed EPDCCH is not a consideration of the UE and is merely a scheduling issue of an eNB.

3) ECCE indices need to be assigned in all PRBs in PRB sets for each EPDCCH for the eNB. Accordingly, different types of ECCEs having the same ECCE index cannot be present at a time.

4) Existence of a specific EPDCCH type needs to have a minimum influence on REs of other EPDCCH types. Minimization of the influence needs to be performed in terms of the number of available ECCEs for the eNB and the number of available EPDCCH candidates for UE.

Characteristics 1) to 4) will now be described in more detail.

Characteristic 1) is an obvious requirement for multiplexing of two EPDCCH types.

Characteristic 2) relates to how each UE considers multiplexing of two EPDCCH types. For simplification of EPDCCH related operations, it is desirable that each UE assume that all ECCEs in one EPDCCH set are of the same type. Through this assumption, signaling of indicating a corresponding type for each ECCE becomes unnecessary. However, a UE can monitor both the localized EPDCCH and distributed EPDCCH in one subframe by setting a plurality of EPDCCH sets. In other words, when two EPDCCH sets are configured for one UE, the type of each EPDCCH set can be independently set. For example, both the EPDCCH sets can be of localized type or distributed type. The two EPDCCH sets may be configured in different types.

Consequently, multiplexing of the localized EPDCCH and distributed EPDCCH in each EPDCCH set is not a consideration of the UE but is merely a scheduling issue of the eNB.

Characteristic 3) relates to ECCE indexing that enables multiplexing of two EPDCCH types. This characteristic can be required when uplink ACK/NACK resources are determined on the basis of ECCE indices of a downlink grant. In other words, when distributed type ECCE #n and localized type ECCE #n are simultaneously present and both the ECCEs are used as downlink grants, uplink ACK/NACK resource collision occurs. This can be solved by ensuring the characteristic that distributed type ECCE #n and localized type ECCE #n share predetermined REs (e.g. a predetermined RE set or a predetermined EREG). This characteristic can prevent uplink ACK/NACK resource collision and secure simplification of scheduling of the eNB.

Figure 29:
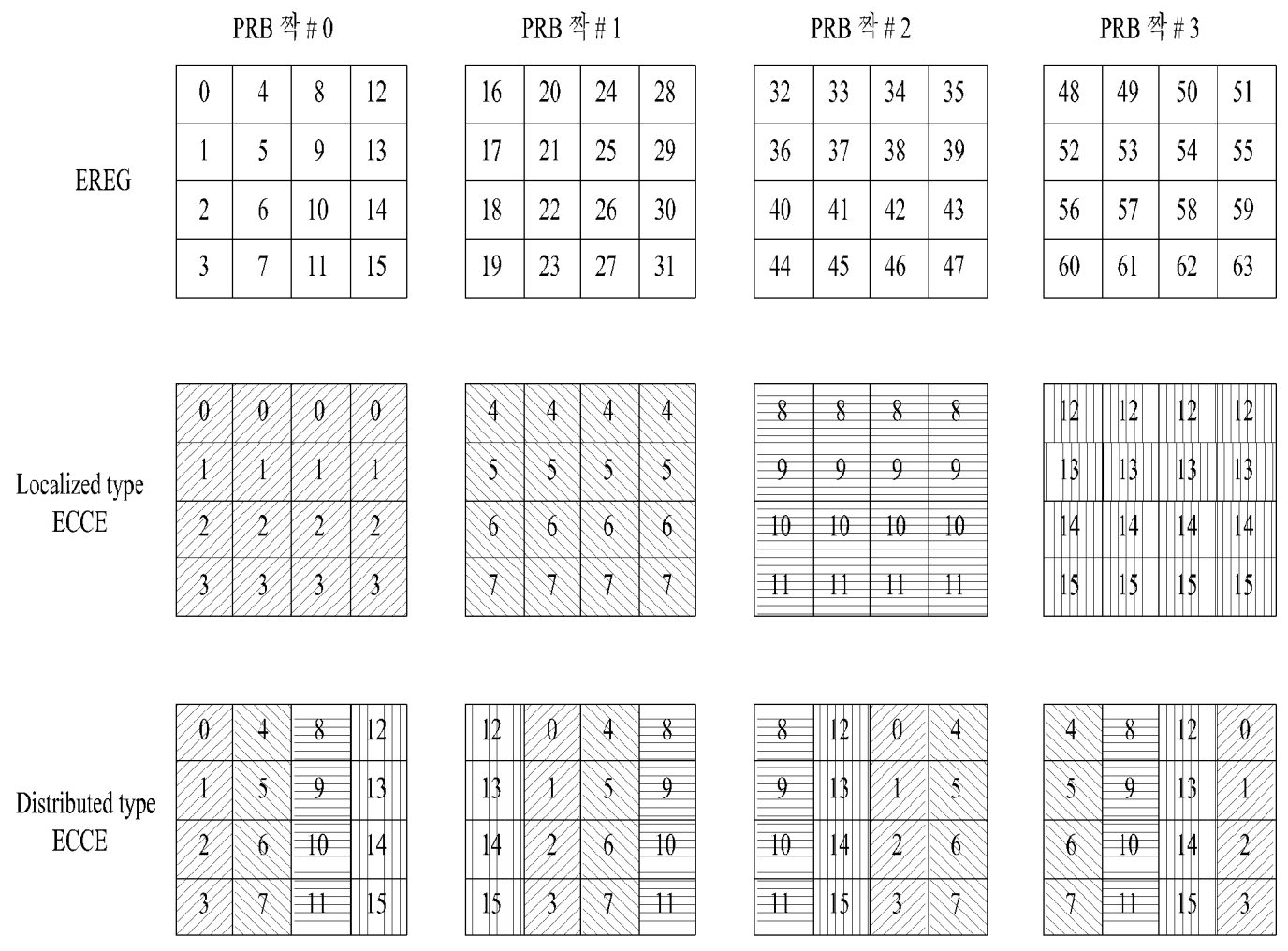

FIG. 29 illustrates mapping between ECCEs and EREGs according to the seventh embodiment of the present invention. Particularly, FIG. 29 shows a method of mapping between ECCEs and EREGs that satisfy characteristics 1), 2) and 3). In FIG. 29, it is assumed that 4 PRB pairs are set as an EPDCCH set, 16 REGs are defined per PRB pair and one ECCE is composed of 4 EREGs. Specifically, portions indicated by the same numeral in the same pattern in each column are EREGs constituting one ECCE.

Referring to FIG. 29, an EREG is used as a common unit constituting an ECCE according to characteristic 1) and the UE performs mapping between ECCEs and EREGs assuming one of localized type ECCE and distributed type ECCE, applied to the EPDCCH set, according to characteristic 2).

Figure 30:
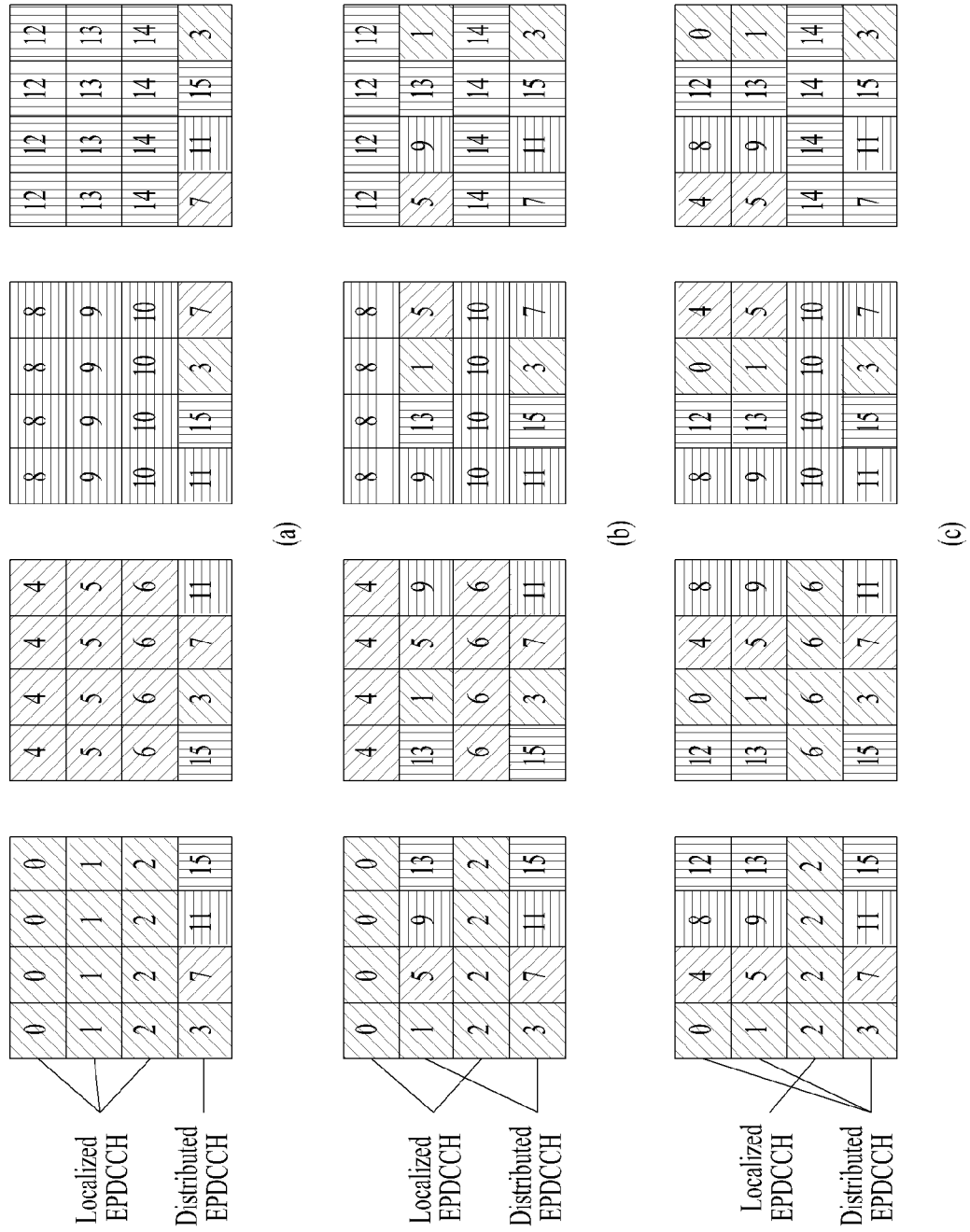
FIG. 30 illustrates an example of multiplexing a localized EPDCCH and a distributed EPDCCH according to the seventh embodiment of the present invention.

FIG. 30 illustrates an example of multiplexing a localized EPDCCH and a distributed EPDCCH according to the seventh embodiment of the present invention. Particularly, FIG. 30 shows multiplexing based on mapping between ECCEs and EREGs, shown in FIG. 29.

Referring to FIG. 30, portions in the same pattern, which are indicated by the same numeral, correspond to a set of EREGs constituting one ECCE and granularity as a unit of multiplexing of the localized EPDCCH and distributed EPDCCH is 16 EREGs, that is, 4 ECCEs.

FIG. 30(a) shows an example in which ECCEs for 3 localized EPDCCHs and ECCEs for one distributed EPDCCH are defined in one PRB pair, FIG. 30(b) shows an example in which ECCEs for 2 localized EPDCCHs and ECCEs for 2 distributed EPDCCHs are defined in one PRB pair and FIG. 30(c) shows an example in which ECCEs for 3 distributed EPDCCHs and ECCEs for one localized EPDCCH are defined in one PRB pair.

Even if ECCEs for a distributed EPDCCH are the same as ECCEs for a localized EPDCCH, characteristic 3) is satisfied when the ECCEs share only one EREG.

As described above, characteristic 4) relates to the influence of existence of different EPDCCH types. Since a set of EREGs constituting an ECCE for a localized EPDCCH cannot be the same as a set of EREGs constituting an ECCE for a distributed EPDCCH, transmission of one localized type ECCE may block transmission of a plurality of localized type ECCEs and vice versa. If an ECCE of a predetermined type blocks a plurality of ECCEs of a different type, then it is desirable to minimize the number of ECCEs of the different type when a plurality of ECCEs of the predetermined type is transmitted.

Referring to FIG. 29, 16 EREGs located in columns constitute one EREG set and EREGs in one EREG set are used to constitute 4 ECCEs irrespective of ECCE type. Accordingly, no ECCE is configured using EREGs included in different EREG sets.

Consequently, even when one localized ECCE blocks 4 distributed ECCEs, as shown in FIGS. 29 and 30, the eNB can configure 4 localized ECCEs by additionally using EREGs belonging to an EREG set used for localized transmission without increasing the number of blocked distributed ECCEs.

In this case, the number of ECCEs of a predetermined type, affected by ECCEs of a different type, can be minimized and the eNB can use a larger number of ECCEs for an EPDCCH of the predetermined type. While the concept of the EREG set is used, the EREG set is for convenience of description and this concept may be implicitly applied to configuration of an EREG and an ECCE.

In addition, characteristic 4) relates to arrangement of each EPDCCH candidate composed of one or more ECCEs from the viewpoint of the UE. For each UE, it is necessary to ensure blocking of only a limited number of EPDCCH candidates of a predetermined type due to existence of an EPDCCH of a different type in arrangement of EPDCCH candidates. This will now be described with reference to the attached drawing.

FIG. 31 illustrates exemplary arrangement of localized EPDCCH candidates at aggregation level 1 according to the seventh embodiment of the present invention. FIG. 31(a) shows a case in which 4 EPDCCH candidates are arranged in a single EREG set and FIG. 31(b) shows a case in which EPDCCH candidates are respectively arranged in different EREG sets.

Referring to FIG. 31, the position of an EPDCCH candidate needs to be determined in consideration of an available position of an EPDCCH candidate of a different type.

Eighth Embodiment

According to the method of allocating D-ECCEs, illustrated in FIG. 13, D-ECCEs are sequentially allocated to K PRB pairs from among N PRB pairs assigned for D-ECCEs and then D-ECCEs are sequentially allocated to neighboring K PRB pairs. In this case, since a plurality of D-ECCEs is allocated using only specific PRB pairs even though available PRB pairs are sufficient, efficiency may be deteriorated and sufficient diversity gain between D-ECCEs cannot be obtained.

Accordingly, the eighth embodiment of the present invention can consider an RE set allocation method that evenly uses allocated PRB pairs. That is, D-ECCEs are sequentially allocated to $$\left\lfloor \frac{N}{K} \right\rfloor$$

neighboring PRB pairs instead of being sequentially allocated in a specific PRB pair.

As in the aforementioned embodiments, it is assumed that one ECCE is composed of K EREGs and one PRB pair is composed of P ECCEs and thus one PRB pair is divided into K*P EREGs. When N PRB pairs are used on this assumption, a total of N*K*P EREGs is defined and N*P ECCEs can be defined using the N*K*P EREGs. In addition, indices can be sequentially allocated to PRB pairs, starting at index 0 allocated to a PRB pair having a lowest index, and index N−1 can be allocated to a PRB pair having the highest index. Similarly, indices 0~(N*P*K)−1 can be respectively allocated to EREGs and indices 0~(N*P)−1 can be respectively assigned to ECCEs.

A) EREG Indexing for Localized ECCE

Referring to ECCEs for a localized EPDCCH shown in FIG. 30, EREGs constituting an ECCE are selected from different PRB pairs. In this case, a spacing between EREGs is set to P which is the number of ECCEs per PRB pair. Here, indices of EREGs constituting ECCE #n can be represented by Expression 8. In Expression 8, EREG index (x, y) represents an EREG with index y in PRB pair #x.

$EREG\#0: \left(\left\lfloor \frac{n}{P} \right\rfloor, (n \bmod P)\right)$ [Expression 8]

$EREG\#1: \left(\left\lfloor \frac{n}{P} \right\rfloor, (n \bmod P) + P\right)$ $EREG\#2: \left(\left\lfloor \frac{n}{P} \right\rfloor, (n \bmod P) + 2P\right), \ldots$ $EREG\#(K-1): \left(\left\lfloor \frac{n}{P} \right\rfloor, (n \bmod P) + (K-1)P\right)$ Referring to Expression 7, the indices of EREGs constituting a localized ECCE are irrelevant to the number of PRB pairs. The index of a PRB pair for localized ECCE #n is $$\left\lfloor \frac{n}{P} \right\rfloor$$

and i-th EREG index of ECCE #n can be represented by Expression 9.

$(n \bmod P) + i \times P (i=0,1,\ldots,K-1)$ [Expression 9]

B) EREG Indexing for Distributed ECCE

FIGS. 30 and 31 illustrate mapping between ECCEs and EREGs for a distributed EPDCCH. If the number of PRB pairs in an EPDCCH set is equal to or greater than the number of EREGs per ECCE, then indices of EREGs constituting distributed ECCE #n can be represented according to Expression 10. In Expression 10, EREG index (x, y) represents an EREG with index y in PRB pair #x.

$EREG\#0:$ [Expression 10]

$$\left(n \bmod \left\lfloor \frac{N}{K} \right\rfloor, P * \left(\left(\left\lfloor \frac{n}{\left\lfloor \frac{N}{K} \right\rfloor} \right\rfloor \bmod P\right) \bmod K\right) + \left\lfloor \frac{n}{K} \right\rfloor\right)$$

$EREG\#1: \left(n \bmod \left\lfloor \frac{N}{K} \right\rfloor + \left\lfloor \frac{N}{K} \right\rfloor,\right.$ $$\left. P * \left(\left(\left\lfloor \frac{n}{\left\lfloor \frac{N}{K} \right\rfloor} \right\rfloor \bmod P + 1\right) \bmod K\right) + \left\lfloor \frac{n}{K} \right\rfloor\right)$$

$EREG\#2: \left(n \bmod \left\lfloor \frac{N}{K} \right\rfloor + 2\left\lfloor \frac{N}{K} \right\rfloor,\right.$ $$\left. P * \left(\left(\left\lfloor \frac{n}{\left\lfloor \frac{N}{K} \right\rfloor} \right\rfloor \bmod P + 2\right) \bmod K\right) + \left\lfloor \frac{n}{K} \right\rfloor\right), \ldots$$

$EREG\#(K-1): \left(n \bmod \left\lfloor \frac{N}{K} \right\rfloor + (K-1)\left\lfloor \frac{N}{K} \right\rfloor,\right.$ $$\left. P * \left(\left(\left\lfloor \frac{n}{\left\lfloor \frac{N}{K} \right\rfloor} \right\rfloor \bmod P + (K-1)\right) \bmod K\right) + \left\lfloor \frac{n}{K} \right\rfloor\right)$$

If the number of PRB pairs in the EPDCCH set is less than the number of EREGs per ECCE, the PRB pair indices in Expression 10 are no longer valid. Accordingly, indices of EREGs constituting distributed ECCE #n can be represented according to Expression 11.

$EREG\#0: \left(n \bmod N, P * \left(\left(\left\lfloor \frac{n}{\left\lfloor \frac{N}{K} \right\rfloor} \right\rfloor \bmod P\right) \bmod K\right) + \left\lfloor \frac{n}{K} \right\rfloor\right)$ [Expression 11]

EREG#1:
$$\left((n+1)\bmod N,\ P*\left(\left(\left\lfloor\frac{n}{\left\lfloor\frac{N}{K}\right\rfloor}\right\rfloor\bmod P+1\right)\bmod K\right)+\left\lfloor\frac{n}{K}\right\rfloor\right)$$

EREG#2:
$$\left((n+2)\bmod N,\right.$$

$$\left.P*\left(\left(\left\lfloor\frac{n}{\left\lfloor\frac{N}{K}\right\rfloor}\right\rfloor\bmod P+1\right)\bmod K\right)+\left\lfloor\frac{n}{K}\right\rfloor\right),\ \ldots$$

EREG#(K − 1):
$$\left((n+K-1)\bmod N,\right.$$

$$\left.P*\left(\left(\left\lfloor\frac{n}{\left\lfloor\frac{N}{K}\right\rfloor}\right\rfloor\bmod P+1\right)\bmod K\right)+\left\lfloor\frac{n}{K}\right\rfloor\right)$$

The index of a PRB pair for ECCE #i from among N ECCEs may be represented according to Expression 12 irrespective of the relationship between the number of PRB pairs in the EPDCCH set and the number of EREGs per ECCE.

$$\left(n\bmod\max\left(1,\left\lfloor\frac{N}{K}\right\rfloor\right)+i*\max\left(1,\left\lfloor\frac{N}{K}\right\rfloor\right)\right)\bmod N \qquad\text{[Expression 12]}$$

C) The Number of ECCEs Per PRB Pair

The number of ECCEs per PRB pair may be 2 or 4 according to subframe type and the number of available REs. A description will be given of ECCE indexing when the number of ECCEs per PRB pair is 2.

EREGs constituting an ECCE for a localized EPDCCH are selected from one PRB pair. On the contrary, for an ECCE of a distributed EPDCCH, EREGs having the same indices as EREGs constituting an ECCE for a localized EPDCCH are selected from a plurality of PRB pairs.

Figure 32:
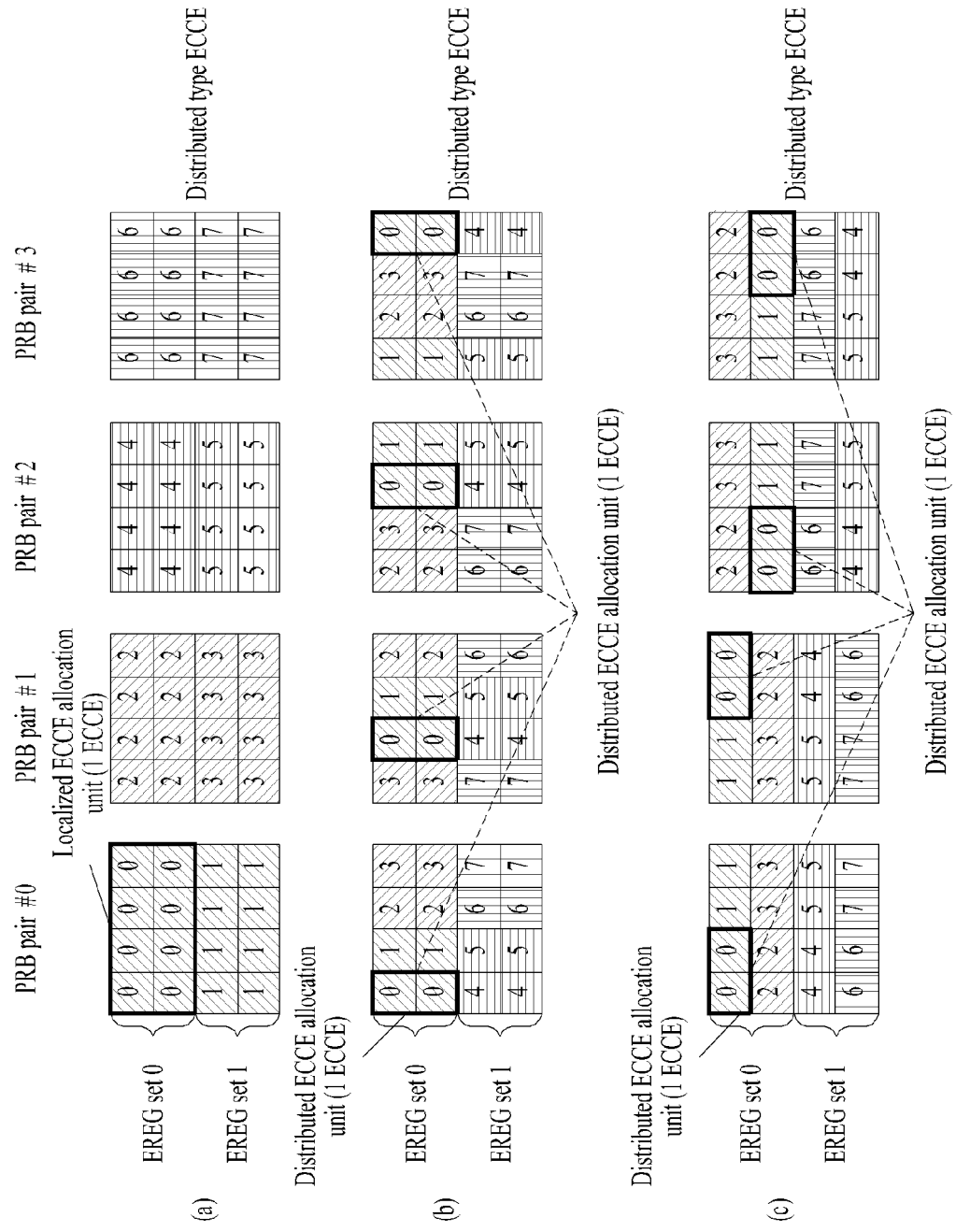
FIG. 32 illustrates a method of configuring an ECCE according to an eighth embodiment of the present invention.

FIG. 32 illustrates a method of configuring an ECCE according to the eighth embodiment of the present invention.

It is assumed that ECCEs for a localized EPDCCH are indexed, as illustrated in FIG. 32(a) and EREGs corresponding to EREG set 0, that is, EREGs with index 0, constitute an ECCE for the localized EPDCCH.

In this case, an ECCE for a distributed EPDCCH is configured by selecting EREGs having the same index, 0, as EREGs constituting the ECCE for the localized EPDCCH from a plurality of PRB pairs, as shown in FIGS. 32(b) and 32(c).

Figure 33:
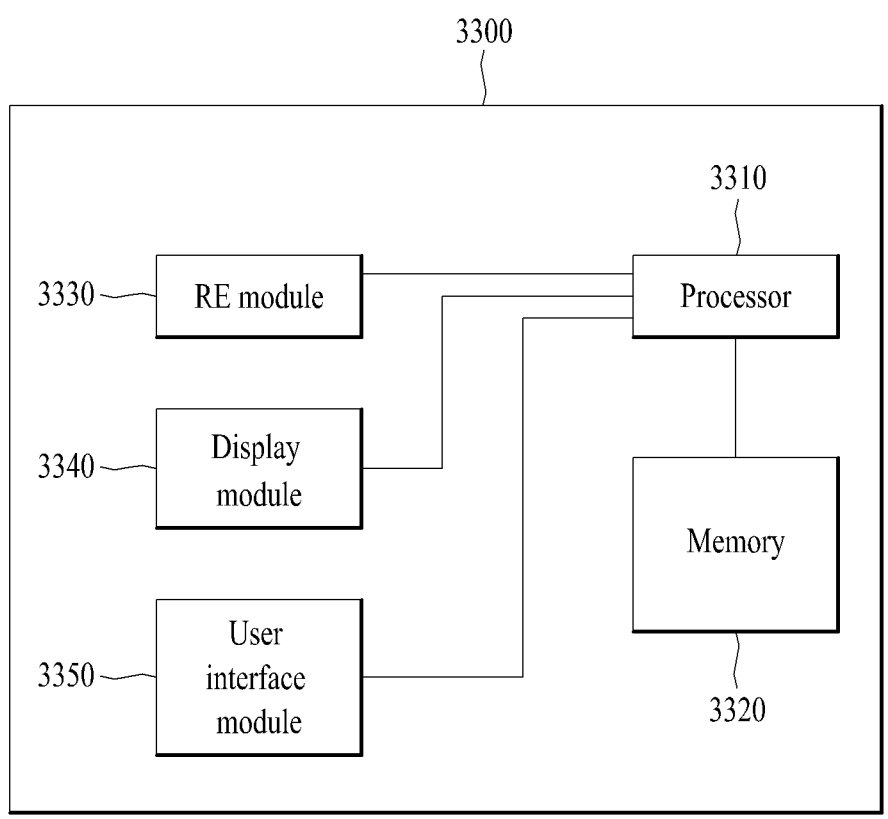
FIG. 33 is a block diagram of a communication apparatus according to an embodiment of the present invention.

FIG. 33 is a block diagram of a communication apparatus according to an embodiment of the present invention.

Referring to FIG. 33, a communication apparatus 3300 includes a processor 3310, a memory 3320, an RF module 3330, a display module 3340 and a user interface module 3350.

The communication apparatus 3300 is illustrated for convenience of description and some modules thereof may be omitted. Furthermore, the communication apparatus 3300 may further include necessary modules. Some modules of the communication apparatus 3300 may be subdivided. The processor 3310 is configured to perform operations according to the embodiments of the present invention, described with reference to attached drawings. Refer to descriptions of FIGS. 1 to 32 for detailed operations of the processor 2110.

The memory 3320 is connected to the processor 3310 and stores an operating system, applications, program code, data, etc. The RF module 3330 is connected to the processor 3310 and converts baseband signals into RF signals or converts RF signals into baseband signals. To achieve this, the RF module 3330 performs analog conversion, amplification, filtering and frequency upconversion or reverse operations thereof. The display module 3340 is connected to the processor 3310 and displays various types of information. The display module 3340 may use a well-known element such as an LCD (Liquid Crystal Display), LED (Light Emitting Diode), OLED (Organic Light Emitting Diode) or the like. However, the display module 3340 is not limited thereto. The user interface module 3350 may be connected to the processor 3310 and configured in the form of a combination of well-known user interfaces such as a keypad, touchscreen and the like.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method for forming a resource block for a search space of a distributed type downlink control channel in a wireless communication system and the apparatus therefor have been described in the context of a 3GPP LTE system, the present invention is also applicable to many other wireless communication systems.

The invention claimed is:

1. A method for receiving an Enhanced Physical Downlink Control Channel (EPDCCH) from a base station by a user equipment (UE) in a wireless communication system, the method comprising:
   defining, by the UE, a first number of Enhanced Resource Element Groups (EREGs) in a resource block pair for the EPDCCH; and
   receiving, by the UE from the base station, the EPDCCH by monitoring EPDCCH candidates comprising one or more Enhanced Control Channel Elements (ECCEs) in the resource block pair,
   wherein each of the one or more ECCEs comprises a second number of EREGs included in different resource blocks, and
   wherein indexes of the second number of EREGs form an ECCE with an index n determined by Expression A, $$\lfloor n/N_{RB}^{Sm} \rfloor + jN_{RB}^{ECCE} \qquad \text{<Expression A>}$$

where $N_{RB}^{ECCE}$ indicates a number of ECCEs per resource block pair, $j=0, 1, \ldots N_{ECCE}^{EREG}-1$, $N_{ECCE}^{EREG}$ indicates the second number of EREGs, and $N_{RB}^{Sm}$ indicates a number of resource block pairs.

2. The method according to claim 1, wherein indexes of the different resource blocks including the second number of EREGs have an interval that is a larger value between 1 and a specific value.

3. The method according to claim 2, wherein the indexes of the different resource blocks including the second number of EREGs are determined by Expression B, $$(n+j\max(1, N_{RB}^{Sm}/N_{ECCE}^{EREG})) \bmod N_{RB}^{Sm}, \qquad \text{<Expression B>}$$

where n is an ECCE index.

4. The method according to claim 1, wherein the first number is a fixed value and the second number is a value varying according to a type of a subframe through which the EPDCCH is received.

5. The method according to claim 4, wherein the second number is 4 or 8 according to a type of a subframe through which the EPDCCH is received.

6. The method according to claim 1, wherein the defining, by the UE, the first number of EREGs comprises allocating indexes of the EREGs to each of the resource block pairs,
   wherein the indexes of the EREGs included in each of the resource block pair have values in the range of 0 to 15.

7. A method for transmitting, by a base station, an Enhanced Physical Downlink Control Channel (EPDCCH) to a user equipment (UE) in a wireless communication system, the method comprising:
   defining, by the base station, a first number of Enhanced Resource Element Groups (EREGs) in a resource block pair for the EPDCCH; and
   transmitting, by the base station to the UE, the EPDCCH using one or more Enhanced Control Channel Elements (ECCEs) in the resource block pair to the UE,
   wherein each of the one or more ECCEs comprises a second number of EREGs included in different resource blocks, and
   wherein indexes of the second number of EREGs form an ECCE with an index n determined by Expression A, $$\lfloor n/N_{RB}^{Sm} \rfloor + jN_{RB}^{ECCE}, \qquad \text{<Expression A>}$$

where $N_{RB}^{ECCE}$ indicates a number of ECCEs per resource block pair, $j=0, 1, \ldots, N_{ECCE}^{EREG}-1$, $N_{ECCE}^{EREG}$ indicates the second number of EREGs, and $N_{RB}^{Sm}$ indicates a number of resource block pairs.

8. The method according to claim 7, wherein indexes of the resource blocks including the second number of EREGs have an interval that is a larger value between 1 and a specific value.

9. The method according to claim 8, wherein the indexes of the resource blocks including the second number of EREGs are determined by Expression B.

$$(n+j\max(1, N_{RB}^{Sm}/N_{ECCE}^{EREG})) \bmod N_{RB}^{Sm}, \qquad \text{<Expression B>}$$

where n is an ECCE index.

10. The method according to claim 7, wherein the first number is a fixed value and the second number is a value varying according to a type of a subframe through which the EPDCCH is transmitted.

11. The method according to claim 10, wherein the second number is 4 or 8 according to a type of a subframe through which the EPDCCH is transmitted.

12. The method according to claim 7, wherein the defining, by the base station, the first number of EREGs comprises allocating indexes of the EREGs to each of the resource block pairs,
   wherein the indexes of the EREGs included in the resource block pair have values in the range of 0 to 15.

13. The method according to claim 1, wherein indexes of the different resource blocks including the second number of EREGs are determined based on a number of resource block pairs divided by the second number.

14. The method according to claim 7, wherein indexes of the different resource blocks including the second number of EREGs are determined based on a number of resource block pairs divided by the second number.

15. A user equipment (UE) in a wireless communication system, the UE comprising:
   a transmitter configured to transmit a signal to a base station;
   a receiver configured to receive a signal from the base station; and
   a processor operatively connected to the transmitter and the receiver,
   wherein the processor is configured to:
     define a first number of Enhanced Resource Element Groups (EREGs) in a resource block pair for an Enhanced Physical Downlink Control Channel (EPDCCH),
     receive the EPDCCH from the base station by monitoring EPDCCH candidates comprising one or more Enhanced Control Channel Elements (ECCEs) in the resource block pair,
     wherein each of the one or more ECCEs comprises a second number of EREGs included in different resource blocks, and
     wherein indexes of the second number of EREGs form an ECCE with an index n determined by Expression A, $$\lfloor n/N_{RB}^{Sm} \rfloor + jN_{RB}^{ECCE}, \qquad \text{<Expression A>}$$

where $N_{RB}^{ECCE}$ indicates a number of ECCEs per resource block pair, $j=0, 1, \ldots, N_{ECCE}^{EREG}-1$, $N_{ECCE}^{EREG}$ indicates the second number of EREGs, and $N_{RB}^{Sm}$ indicates a number of resource block pairs.

16. A base station in a wireless communication system, the base station comprising:
   a transmitter configured to transmit a signal to a user equipment (UE);
   a receiver configured to receive a signal from the UE; and a processor operatively connected to the transmitter and the receiver, wherein the processor is configured to:

define a first number of Enhanced Resource Element Groups (EREGs) in a resource block pair for an Enhanced Physical Downlink Control Channel (EPDCCH), and transmit the EPDCCH using one or more Enhanced Control Channel Elements (ECCEs) in the resource block pair, wherein each of the one or more ECCEs comprises a second number of EREGs included in different resource blocks, and wherein indexes of the second number of EREGs form an ECCE with an index n determined by Expression A, $$\lfloor n/N_{RB}^{S_m} \rfloor + jN_{RB}^{ECCE}, \qquad \text{<Expression A>}$$

where $N_{RB}^{ECCE}$ indicates a number of ECCEs per resource block pair, $j=0, 1, \ldots, N_{ECCE}^{EREG}-1$, $N_{ECCE}^{EREG}$ indicates the second number of EREGs, and $N_{RB}^{S_m}$ indicates a number of resource block pairs.

* * * * *